(12) United States Patent
Fiske

(10) Patent No.: US 7,657,033 B2
(45) Date of Patent: Feb. 2, 2010

(54) CRYPTOGRAPHY RELATED TO KEYS

(75) Inventor: Michael Stephen Fiske, San Francisco, CA (US)

(73) Assignee: Fiske Software LLC, San Francisco, CA (US)

( * ) Notice: Subject to any disclaimer, the term of this patent is extended or adjusted under 35 U.S.C. 154(b) by 616 days.

(21) Appl. No.: 11/298,366

(22) Filed: Dec. 8, 2005

(65) Prior Publication Data

US 2006/0129811 A1 Jun. 15, 2006

Related U.S. Application Data

(60) Provisional application No. 60/679,169, filed on May 9, 2005, provisional application No. 60/634,955, filed on Dec. 10, 2004.

(51) Int. Cl.
H04L 9/16 (2006.01)

(52) U.S. Cl. .................. 380/259; 380/28; 380/284

(58) Field of Classification Search .................. None
See application file for complete search history.

(56) References Cited

U.S. PATENT DOCUMENTS

| | | | |
|---|---|---|---|
| 4,255,811 A | 3/1981 | Adler | |
| 4,316,055 A | 2/1982 | Feistel | |
| 4,405,829 A | 9/1983 | Rivest | |
| 5,001,753 A | 3/1991 | Davio | |
| 5,297,207 A | 3/1994 | Degele | |
| 5,375,170 A | 12/1994 | Shamir | |
| 5,511,123 A | 4/1996 | Adams | |
| 5,687,238 A | 11/1997 | Shimada | |
| 5,724,428 A | 3/1998 | Rivest | |
| 5,835,600 A | 11/1998 | Rivest | |
| 6,031,911 A | 2/2000 | Adams | |
| 6,327,661 B1 | 12/2001 | Kocher | |
| 6,347,143 B1 | 2/2002 | Goff | |
| 6,971,008 B2 * | 11/2005 | Wasilewski et al. | 713/168 |
| 7,215,769 B2 | 5/2007 | Fiske | |
| 7,317,799 B2 * | 1/2008 | Hammersmith et al. | 380/284 |
| 2002/0172366 A1 * | 11/2002 | Peterka et al. | 380/277 |
| 2003/0147532 A1 * | 8/2003 | Hakkarainen et al. | 380/239 |

OTHER PUBLICATIONS

Applied Cryptography, Second Edition, Protocols, Algorithms and Source Code in C, pp. 13 thru 17, 1996, ISBN 0-471-12845-7, Bruce Schneier.

Computer and Network Security: Lecture Notes Ronald L. Rivest, 1998. rivest@mit.edu.

(Continued)

*Primary Examiner*—Minh Dinh
(74) *Attorney, Agent, or Firm*—David Lewis

(57) ABSTRACT

In one embodiment, messages are encrypted with encrypted transformations that commute with one another. In another embodiment, a message is divided into message segments, and with each encrypted message segment one or more encrypted keys are sent. The encrypted keys may be used to decrypt a message segment that is sent at another time, such as the next message segment to be sent. In another embodiment, a sender encrypts a message with a first encryption, which may be unknown to the receiver. Then a receiver encrypts the message with a second encryption. Next the sender removes the first encryption, thereby allowing the receiver to reconstitute the original message by removing the second encryption.

38 Claims, 23 Drawing Sheets

OTHER PUBLICATIONS

The Laws of Cryptography: Cryptographer's Favorites pp. 1 thru 8, 2002. Neal R. Wagner.

Author: Rivest, Title: "6.857 Computer and Network Security: Lecture Notes—Part 3: Unconditional Security", Publisher: Ronald L. Rivest, Published at: http://web.mit.edu/6.857/www/home.html, (No longer a valid web address) Date: Sep. 1998, pp. 1-10. (See p. 2).

Author: Wagner, Title: "The Law of Cryptography: Cryptographer's Favorites 2002", Publisher: Neal R. Wagner, Published at: http://www.cs.utsa.edu/~wagner/laws/favorites.html, Date: Feb. 2002, pp. 1-8. (See pp. 1-2).

Author: Schneier, Title: "Applied Cryptography, Second Edition", Publisher: John Wlley & Sons, Inc., Date: 1996, pp. 12-17 (See pp. 13-16).

Author: Shannon, Title: "Communication Theory of Secrecy Systems", Publisher: Bell System Technical Journal, vol. 28(4), Date: 1949, pp. 656-715.

* cited by examiner

TABLE 1

| a | b | a⊕b |
|---|---|-----|
| 0 | 0 | 0 |
| 0 | 1 | 1 |
| 1 | 0 | 1 |
| 1 | 1 | 0 |

FIG. 3

TABLE 2

| A   | 0 | 0 | 0 | 1 | 1 | 0 | 1 | 1 |
|-----|---|---|---|---|---|---|---|---|
| B   | 0 | 1 | 0 | 1 | 0 | 1 | 0 | 1 |
| A⊕B | 0 | 1 | 0 | 0 | 1 | 1 | 1 | 0 |

FIG. 4

TABLE 3

| a | b | a↔b |
|---|---|-----|
| 0 | 0 | 1 |
| 0 | 1 | 0 |
| 1 | 0 | 0 |
| 1 | 1 | 1 |

FIG. 5

TABLE 4

| New Data 1302 | Encryption Operator 1304 | Encryption Key 1306 |
|---|---|---|
| $M_m$ | • | $K_{pm-p+1}$ |
| $K_{pm+2}$ | • | $K_{pm-p+2}$ |
| . | . | . |
| . | . | . |
| . | . | . |
| $K_{pm+p+1}$ | • | $K_{pm+1}$ |

FIG. 13

TABLE 5

| New Data 1402 | Encryption Operator 1404 | Encryption Key 1406 |
|---|---|---|
| $M_m$ | • | $K_{2m-1}$ |
| $K_{2m+2}$ | • | $K_{2m}$ |
| $K_{2m+3}$ | • | $K_{2m+1}$ |

FIG. 14

TABLE 6

| New Data 1302 | Encryption Operator 1304 | Encryption Key 1306 | Decryption Transformation 1508 | |
|---|---|---|---|---|
| $M_m$ | • | $K_{pm-p+1}$ | • | $K_{pm-p+1}$ |
| $K_{pm+2}$ | • | $K_{pm-p+2}$ | • | $K_{mm-p+2}$ |
| . | . | . | . | . |
| . | . | . | . | . |
| . | . | . | . | . |
| $K_{pm+p+1}$ | • | $K_{pm+1}$ | • | $K_{pm+1}$ |

FIG. 15

TABLE 7

| New Data 1402 | Encryption Operator 1404 | Encryption Key 1406 | Decryption Transformation 1608 | |
|---|---|---|---|---|
| $M_m$ | • | $K_{2m-1}$ | • | $K_{2m-1}$ |
| $K_{2m+2}$ | • | $K_{2m}$ | • | $K_{2m}$ |
| $K_{2m+3}$ | • | $K_{2m+1}$ | • | $K_{2m+1}$ |

FIG. 16

TABLE 8

| 1702 | START | | | |
|---|---|---|---|---|
| | Keys Initially Known by Recipient | $K_1$ | $K_2$ | $K_3$ |
| 1704 | Counter m=1 | | | |
| 1706 | Encrypted Message Transmitted: $M_1 \cdot K_1$ $K_4 \cdot K_2$ $K_5 \cdot K_3$ | | | |
| 1708 | Decryption Operations $M_1 \cdot K_1 \cdot K_1$ $K_4 \cdot K_2 \cdot K_2$ $K_5 \cdot K_3 \cdot K_3$ | | | |
| 1710 | Decrypted Information Transmitted | $M_1$ | $K_4$ | $K_5$ |
| 1712 | Counter m=2 | | | |
| 1714 | Encrypted Message Transmitted: $M_2 \cdot K_4$ $K_6 \cdot K_5$ $K_7 \cdot K_3$ | | | |
| 1716 | Decryption Operations $M_2 \cdot K_4 \cdot K_4$ $K_6 \cdot K_5 \cdot K_5$ $K_7 \cdot K_3 \cdot K_3$ | | | |
| 1718 | Decrypted Information Transmitted | $M_2$ | $K_6$ | $K_7$ |

FIG. 17

TABLE 9

| 1802 | Counter m=3 | | | |
|---|---|---|---|---|
| 1804 | Encrypted Message Transmitted: | | | |
| | $M_3$ · $K_5$ <br> $K_8$ · $K_6$ <br> $K_9$ · $K_7$ | | | |
| 1806 | Decryption Operations | | | |
| | $M_3$ · $K_5$ · $K_5$ <br> $K_8$ · $K_6$ · $K_6$ <br> $K_9$ · $K_7$ · $K_7$ | | | |
| 1808 | Decrypted Information Transmitted | $M_1$ | $K_8$ | $K_9$ |

Embodiment 1

Before Transmission 1, Sender and Receiver Know
Keys K1, K2, K3

Transmission 1

| Encryption Sent | Decryption Transformation | Receiver Knows |
|---|---|---|
| $M_1 \cdot K_1$ | $\cdot K_1$ | $M_1$ |
| $K_4 \cdot (K_2 \cdot K_3)$ | $\cdot (K_2 \cdot K_3)$ | $K_4$ |

Transmission 2

| Encryption Sent | Decryption Transformation | Receiver Knows |
|---|---|---|
| $M_2 \cdot K_2$ | $\cdot K_2$ | $M_2$ |
| $K_5 \cdot (K_3 \cdot K_4)$ | $\cdot (K_3 \cdot K_4)$ | $K_5$ |

Transmission 3

| Encryption Sent | Decryption Transformation | Receiver Knows |
|---|---|---|
| $M_3 \cdot K_3$ | $\cdot K_3$ | $M_3$ |
| $K_6 \cdot (K_4 \cdot K_5)$ | $\cdot (K_4 \cdot K_5)$ | $K_6$ |

Transmission 4

| Encryption Sent | Decryption Transformation | Receiver Knows |
|---|---|---|
| $M_4 \cdot K_4$ | $\cdot K_4$ | $M_4$ |
| $K_7 \cdot (K_5 \cdot K_6)$ | $\cdot (K_5 \cdot K_6)$ | $K_7$ |

FIG. 18B (2)

Transmission    5

| Encryption Sent | Decryption Transformation | Receiver Knows |
|---|---|---|
| $M_5 \cdot K_5$ | $\cdot K_5$ | $M_5$ |
| $K_8 \cdot (K_6 \cdot K_7)$ | $\cdot (K_6 \cdot K_7)$ | $K_8$ |

Transmission    6

| Encryption Sent | Decryption Transformation | Receiver Knows |
|---|---|---|
| $M_6 \cdot K_6$ | $\cdot K_6$ | $M_6$ |
| $K_9 \cdot (K_7 \cdot K_8)$ | $\cdot (K_7 \cdot K_8)$ | $K_9$ |

FIG. 18C

Embodiment 2
Before Transmission 1, Sender and Receiver Know Keys K1, K2, K3

Transmission 1
| Encryption Sent | Decryption Transformation | Receiver Knows: |
|---|---|---|
| $M_1 \cdot (K_1 \cdot K_3)$ | $\cdot (K_1 \cdot K_3)$ | $M_1$ |
| $K_4 \cdot (K_2 \cdot K_3)$ | $\cdot (K_2 \cdot K_3)$ | $K_4$ |

Transmission 2
| Encryption Sent | Decryption Transformation | Receiver Knows: |
|---|---|---|
| $M_2 \cdot (K_2 \cdot K_4)$ | $\cdot (K_2 \cdot K_4)$ | $M_2$ |
| $K_5 \cdot (K_3 \cdot K_4)$ | $\cdot (K_3 \cdot K_4)$ | $K_5$ |

Transmission 3
| Encryption Sent | Decryption Transformation | Receiver Knows: |
|---|---|---|
| $M_3 \cdot (K_3 \cdot K_5)$ | $\cdot (K_3 \cdot K_5)$ | $M_3$ |
| $K_6 \cdot (K_4 \cdot K_5)$ | $\cdot (K_4 \cdot K_5)$ | $K_6$ |

Transmission 4
| Encryption Sent | Decryption Transformation | Receiver Knows: |
|---|---|---|
| $M_4 \cdot (K_4 \cdot K_6)$ | $\cdot (K_4 \cdot K_6)$ | $M_4$ |
| $K_7 \cdot (K_5 \cdot K_6)$ | $\cdot (K_5 \cdot K_6)$ | $K_7$ |

Transmission 5
| Encryption Sent | Decryption Transformation | Receiver Knows: |
|---|---|---|
| $M_5 \cdot (K_5 \cdot K_7)$ | $\cdot (K_5 \cdot K_7)$ | $M_5$ |
| $K_8 \cdot (K_6 \cdot K_7)$ | $\cdot (K_6 \cdot K_7)$ | $K_8$ |

Transmission 6
| Encryption Sent | Decryption Transformation | Receiver Knows: |
|---|---|---|
| $M_6 \cdot (K_6 \cdot K_8)$ | $\cdot (K_6 \cdot K_8)$ | $M_6$ |
| $K_9 \cdot (K_7 \cdot K_8)$ | $\cdot (K_7 \cdot K_8)$ | $K_9$ |

FIG. 18D

Embodiment 3

Before Transmission 1, Sender and Receiver Know Keys K1, K2, K3

Transmission 1

Sender and receiver set Q equal to    $K_1$

| Encryption Sent | Decryption Transformation | Receiver Knows: |
|---|---|---|
| $M_0 \cdot (Q \cdot K_2)$ | $\cdot (Q \cdot K_2)$ | $M_0$ |
| $K_4 \cdot (K_1 \cdot K_3)$ | $\cdot (K_1 \cdot K_3)$ | $K_4$ |

Transmission 2

Sender and receiver set Q equal to    $Q \cdot K_2$    ($Q = K_1 \cdot K_2$)

| Encryption Sent | Decryption Transformation | Receiver Knows: |
|---|---|---|
| $M_2 \cdot (Q \cdot K_3)$ | $\cdot (Q \cdot K_3)$ | $M_2$ |
| $K_5 \cdot (K_2 \cdot K_4)$ | $\cdot (K_2 \cdot K_4)$ | $K_5$ |

Transmission 3

Sender and receiver set Q equal to    $Q \cdot K_3$    ($Q = K_1 \cdot K_2 \cdot K_3$)

| Encryption Sent | Decryption Transformation | Receiver Knows: |
|---|---|---|
| $M_3 \cdot (Q \cdot K_4)$ | $\cdot (Q \cdot K_4)$ | $M_3$ |
| $K_6 \cdot (K_3 \cdot K_5)$ | $\cdot (K_3 \cdot K_5)$ | $K_6$ |

Transmission 4

Sender and receiver set Q equal to    $Q \cdot K_4$    ($Q = K_1 \cdot K_2 \cdot K_3 \cdot K_4$)

| Encryption Sent | Decryption Transformation | Receiver Knows: |
|---|---|---|
| $M_4 \cdot (Q \cdot K_5)$ | $\cdot (Q \cdot K_5)$ | $M_4$ |
| $K_7 \cdot (K_4 \cdot K_6)$ | $\cdot (K_4 \cdot K_6)$ | $K_7$ |

FIG. 18E

Transmission 5

Sender and receiver set Q equal to     $Q \cdot K_5$     $(Q = K_1 \cdot K_2 \cdot K_3 \cdot K_4 \cdot K_5)$

| Encryption Sent | Decryption Transformation | Receiver Knows: |
|---|---|---|
| $M_5 \cdot (Q \cdot K_6)$ | $\cdot (Q \cdot K_6)$ | $M_5$ |
| $K_8 \cdot (K_5 \cdot K_7)$ | $\cdot (K_5 \cdot K_7)$ | $K_8$ |

FIG. 18F

Embodiment 4

Before Transmission 1, Sender and Receiver Know Keys K1, K2, K3, and K4

Transmission 1

| Encryption Sent | Decryption Transformation | Receiver Knows: |
|---|---|---|
| $M_1 \cdot K_1$ | $K_1$ | $M_1$ |
| $K_5 \cdot (K_2 \cdot K_3)$ | $(K_2 \cdot K_3)$ | $K_5$ |
| $K_6 \cdot (K_3 \cdot K_4)$ | $(K_3 \cdot K_4)$ | $K_6$ |

Transmission 2

| Encryption Sent | Decryption Transformation | Receiver Knows: |
|---|---|---|
| $M_2 \cdot K_2$ | $K_2$ | $M_2$ |
| $K_7 \cdot (K_4 \cdot K_5)$ | $(K_4 \cdot K_5)$ | $K_7$ |
| $K_8 \cdot (K_5 \cdot K_6)$ | $(K_5 \cdot K_6)$ | $K_8$ |

Transmission 3

| Encryption Sent | Decryption Transformation | Receiver Knows: |
|---|---|---|
| $M_3 \cdot K_3$ | $K_3$ | $M_3$ |
| $K_9 \cdot (K_6 \cdot K_7)$ | $(K_6 \cdot K_7)$ | $K_9$ |
| $K_{10} \cdot (K_7 \cdot K_8)$ | $(K_7 \cdot K_8)$ | $K_{10}$ |

Transmission 4

| Encryption Sent | Decryption Transformation | Receiver Knows: |
|---|---|---|
| $M_4 \cdot K_4$ | $K_4$ | $M_4$ |
| $K_{11} \cdot (K_8 \cdot K_9)$ | $(K_8 \cdot K_9)$ | $K_{11}$ |
| $K_{12} \cdot (K_9 \cdot K_{10})$ | $(K_9 \cdot K_{10})$ | $K_{12}$ |

Transmission 5

| Encryption Sent | Decryption Transformation | Receiver Knows: |
|---|---|---|
| $M_5 \cdot K_5$ | $K_5$ | $M_5$ |
| $K_{13} \cdot (K_{10} \cdot K_{11})$ | $(K_{10} \cdot K_{11})$ | $K_{13}$ |
| $K_{14} \cdot (K_{11} \cdot K_{12})$ | $(K_{11} \cdot K_{12})$ | $K_{14}$ |

CRYPTOGRAPHY RELATED TO KEYS

RELATED APPLICATIONS

This application claims priority benefit of U.S. Provisional Patent Application Ser. No. 60/679,169, entitled "Lock Cryptography with Initial Key," filed May 9, 2005, which is incorporated herein by reference. This application also claims priority benefit of and also incorporates by reference U.S. Provisional Patent Application No. 60/634,955, entitled "Multiple Lock Cryptography," filed Dec. 10, 2004. This application incorporates by reference U.S. Provisional Patent Application Ser. No. 60/424,299, entitled "Non-Autonomous Dynamical Orbit Cryptography," filed Nov. 6, 2002. This application also incorporates by reference U.S. patent application Ser. No. 10/693,053, entitled "Non-Autonomous Dynamical Orbit Cryptography," filed Oct. 25, 2003, which is also Publication No. US-2004-0228480-A1.

FIELD

The specification generally relates to securely transmitting and storing information.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Cryptographic devices and methods are generally used to encrypt and decrypt information transmitted through communication and transmission systems. However, cryptographic devices and methods may also be used to encrypt passive data stored on a computer or another physical device such as a tape drive or flash memory. A plaintext message may be encrypted by a sender using a unique key, and the encrypted message, called ciphertext, is transmitted to a receiver. Using the same key (symmetric) or a distinct key, the receiver may apply a decryption device or method to the ciphertext. The output of this decryption device or method is expected to be the same plaintext message that the sender gathered before encrypting and sending the plaintext message.

BRIEF DESCRIPTION OF THE FIGURES

In the following drawings like reference numbers are used to refer to like elements. Although the following figures depict various examples of the invention, the invention is not limited to the examples depicted in the figures.

FIG. 3 shows TABLE 1, which is a truth table for the exclusive-or operator.

FIG. 4 shows TABLE 2, which shows an example of an operator that is formed by a bitwise application of the exclusive-or operator.

FIG. 5 shows TABLE 3, which is a truth table for the biconditional operator.

FIG. 13 shows a TABLE 4 of an example of a transmission that a sender may send to a receiver via the method of FIG. 9.

FIG. 14 shows a TABLE 5. The contents of TABLE 5 are a more specific example of the transmission described more generally in conjunction with TABLE 4.

FIG. 15 shows a TABLE 6 of the decryption computations performed by the receiver.

FIG. 16 shows a TABLE 7. The contents of TABLE 7 are a more specific example of the computations described more generally in conjunction with TABLE 6.

FIGS. 17 and 18A show TABLEs 8 and 9, respectively, which show an example of the first three transmissions for a situation in which two new keys are generated.

FIGS. 18B(1)-18F show different embodiments that use composite keys for encryption.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-9 is a brief description of each element, which may have no more than the name of each of the elements in the particular figure that is being discussed. After the brief description of each element, each element of FIGS. 1-9 is further discussed in numerical order. In general, each of FIGS. 1-20 is discussed in numerical order, and the elements within FIGS. 1-20 are also usually discussed in numerical order to facilitate easily locating the discussion of a particular element. Nonetheless, there is not necessarily any one location where all of the information of any element of FIGS. 1-20 is located. Unique information about any particular element or any other aspect of any of FIGS. 1-20 may be found in, or implied by, any part of the specification.

In various places of the specification a letter is used to refer to a particular numerical value. Unless indicated otherwise, the numerical values represented by these letters are unrelated to one another. Specifically, even though one letter (e.g., "m" or "n") comes earlier in the alphabet than another letter (e.g., "n" or "p," respectively), the order of these letters in the alphabet does not mean that the earlier letter represents a smaller number. The value of the earlier letter is unrelated to the later letter, and may represent a value that is greater the same or less than the later letter.

Figure 1:
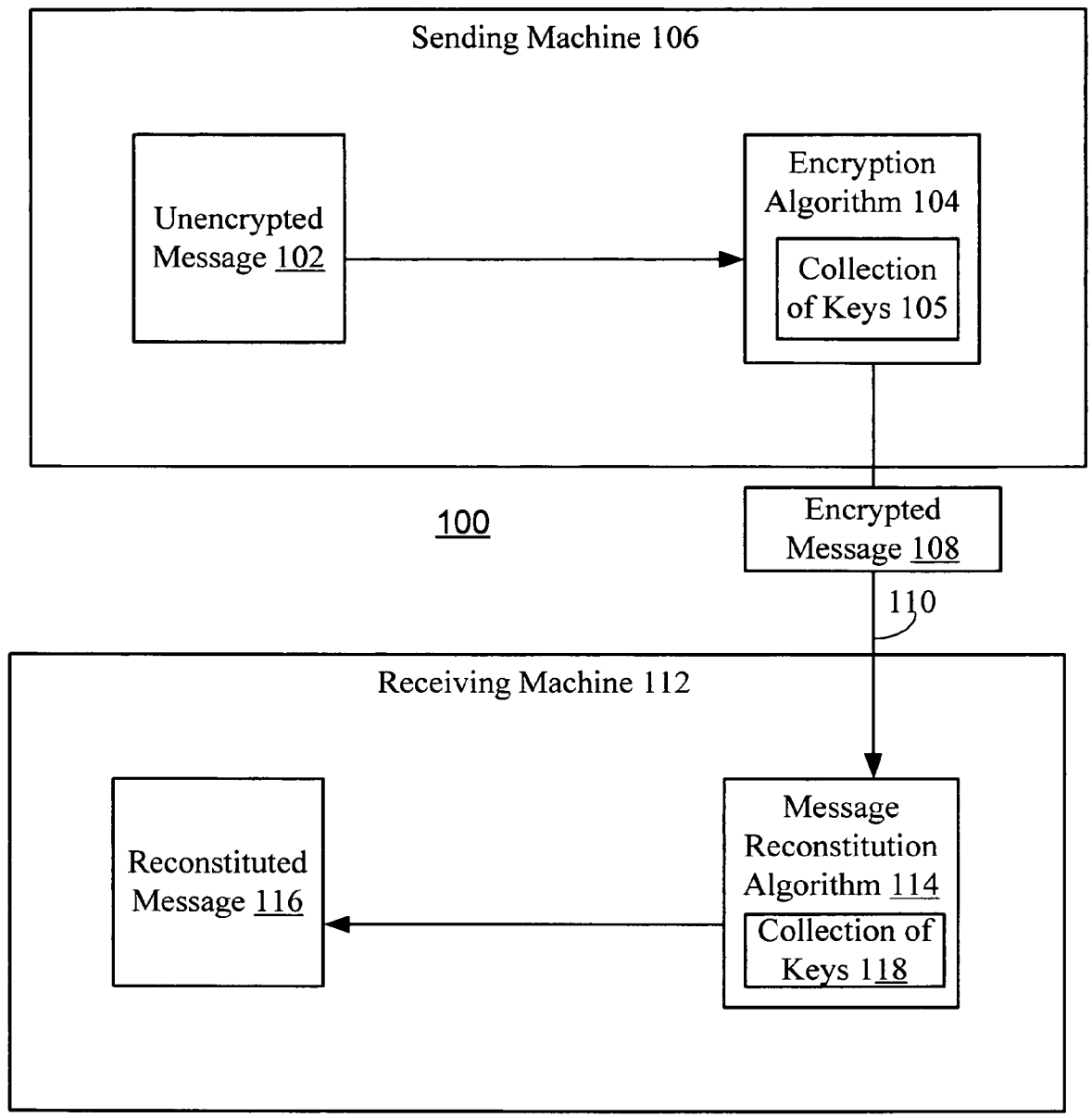
FIG. 1 shows a message system for sending encrypted messages.

FIG. 1 shows a message system 100 for sending messages in a manner that is expected to be secure. Message system 100 includes an unencrypted message 102, an encryption algorithm 104, a collection of keys 105, a sending machine 106, an encrypted message 108, a transmission path 110, a receiving machine 112, a message reconstitution algorithm 114, a reconstituted message 116, and a collection of keys 118. In other embodiments, message system 100 may not have all of the components listed above or may have other components instead of and/or in addition to those listed above.

Message system 100 may be used for transmitting encrypted messages. Unencrypted message 102 may be a message that has not been encrypted yet (e.g., unencrypted message 102 may include plaintext), that is intended to be delivered to another location, software unit, machine, person, or other entity. In this specification, the term location may refer to geographic locations and/or storage locations. A particular storage location may be a collection of contiguous and/or noncontiguous locations on one or more machine readable media. Two different storage locations may refer to two different sets of locations on one or more machine-readable media in which the locations of one set may be intermingled with the locations of the other set. In this specification, the term "machine-readable medium" is used to refer to any medium capable of carrying information that is readable by a machine. One example of a machine-readable medium is a computer-readable medium. Another example of a machine-readable medium is paper having holes that are detected that trigger different mechanical, electrical, and/or logic responses. The term machine-readable medium also includes media that carry information while the information is in transit from one location to another, such as copper wire and/or optical fiber and/or the atmosphere and/or outer space.

It may be desirable to keep the contents of unencrypted message 102 secret. Consequently, it may be desirable to encrypt unencrypted message 102, so that the message is expected to be unintelligible to an unintended recipient should the unintended recipient attempt to read and/or decipher the message transmitted. Unencrypted message 102 may be a collection of multiple messages, an entire message, a message segment, or any other portion of a message.

Encryption algorithm 104 may be a series of steps that are performed to encrypt unencrypted message 102. In this specification, the term "algorithm" refers to a series of one or more operations. In one embodiment, the term "algorithm" refers to one or more instructions for carrying out the series of operations that may be stored on a machine-readable medium. Alternatively, the algorithm may be carried out by and therefore refer to hardware (e.g., logic circuits) or may be a combination of instructions stored on a machine-readable medium and hardware that cause the operations to be carried out. Unencrypted message 102 may be an input for encryption algorithm 104. The steps that are included in encryption algorithm 104 may include one or more mathematical operations, and/or one or more other operations. For example, encryption algorithm 104 may include a single mathematical formula or may include a series of mathematical operations applied to a binary or other representation of the message 102.

As another example, encryption algorithm 104 may be a collection of series of substitution and/or conversion rules (such as applying a binary bit operator to a randomly generated key and the bits that make up the message or other conversion rules) applied to the symbols and/or words of message 102. An embodiment in which encryption algorithm 104 includes an application of mathematical operators to a binary representation of message 102 is discussed below, in conjunction with FIG. 2. The output of encryption algorithm 104 is an encrypted message that is generated from unencrypted message 102.

Collection of keys 105 may include one or more keys, which may be grouped into one or more groups of keys and/or sets of keys. Collection of keys 105 may be used by encryption algorithm 104 to encrypt at least part of unencrypted message 102. For example, encryption algorithm 104 may include one or more binary operations that use unencrypted message 102 as one input and at least part of at least one key of collection of keys 105 as another input to produce an output. In this specification, a binary operator is any operator that has two inputs and at least one output. In an embodiment, one or more keys of collection of keys 105 are generated by encryption algorithm 104 and/or by a reconstitution algorithm (e.g., a decryption algorithm). By using a collection of keys 105, multiple parties may use the same encryption algorithm, but are still not expected to be able to decrypt one another's messages unless they use the same key of collection of keys 105. Collection of keys 105 may be a broad range of sizes. For example, if the size of a key from collection of keys 105 is measured in bits, one or more keys within collection of keys 105 may be 64 bits, 128 bits, 912 bits, 1000 bits, 1024 bits, 4096 bits or larger. The number of keys in collection of keys 105 may change and/or the actual keys included in collection of keys 105 may change while sending a message.

Sending machine 106 may be a message machine that handles messages at or is associated with a first location, software unit, machine, person, sender, or other entity. Sending machine 106 may be a computer, a phone, a telegraph, another type of electronic device, a mechanical device, or other kind of machine that sends messages. Sending machine 106 may include one or more processors and/or may include specialized circuitry for handling messages. Sending machine 106 may receive unencrypted message 102 from another source, may produce all or part of message 102, may implement encryption algorithm 104, and/or may transmit the output of algorithm 104 to another entity. In another embodiment, sending machine 106 receives unencrypted message 102 from another source, while encryption algorithm 104 and the delivery of the output of encryption algorithm 104 are implemented manually. In another embodiment, sending machine 106 implements encryption algorithm 104, having unencrypted message 102 entered, via a keyboard (for example), into sending machine 106. In another embodiment, sending machine 106 receives output from encryption algorithm 104 and sends the output to another entity. In an embodiment, sending machine 106 may generate new keys for collection of keys 105 and/or for other message machines. Throughout this specification other embodiments may be obtained by substituting a human being, software, or other entity for the sending machine 106.

Encrypted message 108 includes at least some text that is encrypted (e.g., ciphertext). Encrypted message 108 is generated from unencrypted message 102. However, the content of encrypted message 108 that is from unencrypted message 102 is encrypted within encrypted message 108, but unencrypted within unencrypted message 102. Encrypted message 108 may be the output of encryption algorithm 104, which may be transmitted by sending machine 106. A key chosen from collection of keys 105 may be used as a second input for encrypting a part of or all of unencrypted message 102, and collection of keys 105 may facilitate decrypting and/or partially decrypting encrypted message 108, which was encrypted using collection of keys 105.

Transmission path 110 is the path taken by encrypted message 108 to get to the destination to which encrypted message 108 was sent. Transmission path 110 may include one or more networks. For example, transmission path 110 may be the Internet. Transmission path 110 may include any combination of any of a direct connection, hand delivery, vocal delivery, one or more Local Area Networks (LANs), one or more Wide Area Networks (WANs), one or more phone networks, and/or one or more wireless networks, including wireless paths under the ground and/or inside and/or outside the earth's atmosphere.

Receiving machine 112 may be a message machine that handles messages at the destination of an encrypted message 108. Receiving machine 112 may be a computer, a phone, a telegraph, another type of electronic device, a mechanical device, or other kind of machine that receives messages. Receiving machine 112 may include one or more processors and/or specialized circuitry configured for handling messages, such as encrypted message 108. Receiving machine 112 may receive encrypted message 108 from another source and/or reconstitute (e.g., decrypt) all or part of encrypted message 108. In one embodiment, receiving machine 112 only receives encrypted message 108 from transmission path 110, while encryption algorithm 104 is implemented manually and/or by another message machine. In another embodiment, receiving machine 112 implements a reconstitution algorithm that reproduces all or part of message 102. In another embodiment, receiving machine 112 receives encrypted massage 108 from transmission path 110, and reconstitutes all or part of unencrypted message 102. Receiving machine 112 may be identical to sending machine 106. For example, receiving machine 112 may receive unencrypted message 102 from another source, produce all or part of unencrypted message 102, and/or implement encryption algorithm 104. Similar to sending machine 106, receiving machine 112 may generate keys. Receiving machine 112 may transmit the output of algorithm 104, via transmission path 110 to another entity and/or receive encrypted message 108 (via transmission path 110) from another entity. Receiving machine 112 may present encrypted message 108 for use as input to reconstitution algorithm 114 and/or implement reconstitution algorithm 114. Throughout this specification other embodiments may be obtained by substituting a human being, software, and/or another entity for the receiving machine 112.

Reconstitution algorithm 114 at least partially reconstitutes at least part of unencrypted message 102 based on encrypted message 108. Reconstitution algorithm 114 may use encrypted message 108 and a key as inputs and produce unencrypted message 102 as an output. In an embodiment, reconstitution algorithm 114 may be implemented by receiving machine 112. In an embodiment (which may or may not be the same embodiment), reconstitution algorithm 114 may receive input (e.g., encrypted message 108) from transmission path 110 and/or receiving machine 112. Reconstitution algorithm 114 and encryption algorithm 104 may be different portions of the same algorithm and/or the same algorithm implemented with a different set of parameters and/or other inputs. In an embodiment, reconstitution algorithm 114 reconstitutes unencrypted message 102 by inverting encryption algorithm 104. In an embodiment, inverting encryption algorithm 104 is accomplished by applying encryption algorithm 104 a second time.

Collection of keys 118 may include one or more keys, which may be used by reconstitution algorithm 114 to at least partially reconstitute encrypted message 108. In an embodiment, one or more keys of collection of keys 118 are generated by encryption algorithm 104 and/or reconstitution algorithm 114. Collection of keys 118 may be the same as collection of keys 105, in which case reconstitution algorithm 114 may be capable of completely reconstituting unencrypted message 102 by decrypting encrypted message 108.

In another embodiment, collection of keys 118 is different from collection of keys 105. In an embodiment, encryption algorithm 104 may use an encryption that requires a different key for decryption than is used for encryption. In this embodiment, collection of keys 118 may include one or more decryption keys. In an embodiment, new keys are sent from collection of keys 105 of sending machine 106 to collection of keys 118 for use in reconstituting encrypted message 108. In an embodiment, collection of keys 118 may include keys for reconstituting messages and for encrypting other messages.

In another embodiment, after using collection of keys 105 for the encryption of encrypted message 108, reconstitution algorithm 114 may first use collection of keys 118 to further encrypt encrypted message 108, and send encrypted message 108 back to sending machine 106. Then sending machine 106 may use a key from collection of keys 105 to remove the encryption that sending machine 106 added earlier. Next, sending machine 106 may return encrypted message 108 (now having only the encryption added by receiving machine 112) back to receiving machine 112, and receiving machine 112 may use reconstitution algorithm 114 and collection of keys 118 to further decrypt encrypted message 108, thereby reconstituting unencrypted message 102.

Similar to collection of keys 105, one or more keys of collection of keys 118 may be a broad range of sizes, such as 64 bits, 128 bits, 912 bits, 1000 bits, 1024 bits, 4096 bits or larger. In an embodiment, a key K of collection of keys 105 and/or of collection of keys 118 may be divided into segments, which may be of the same size or of different sizes compared to one another. For example, key K may be divided into key halves $K_a$ and $K_b$. If K is ABCD1234, then $K_a$ may be ABCD and $K_b$ is 1234. As another example, if K is 1011 1000 1101 0011 1001 0001 1111 0000, then $K_a$ may be 1011 1000 1101 0011 and $K_b$ may be 1001 0001 1111 0000.

Figure 2:
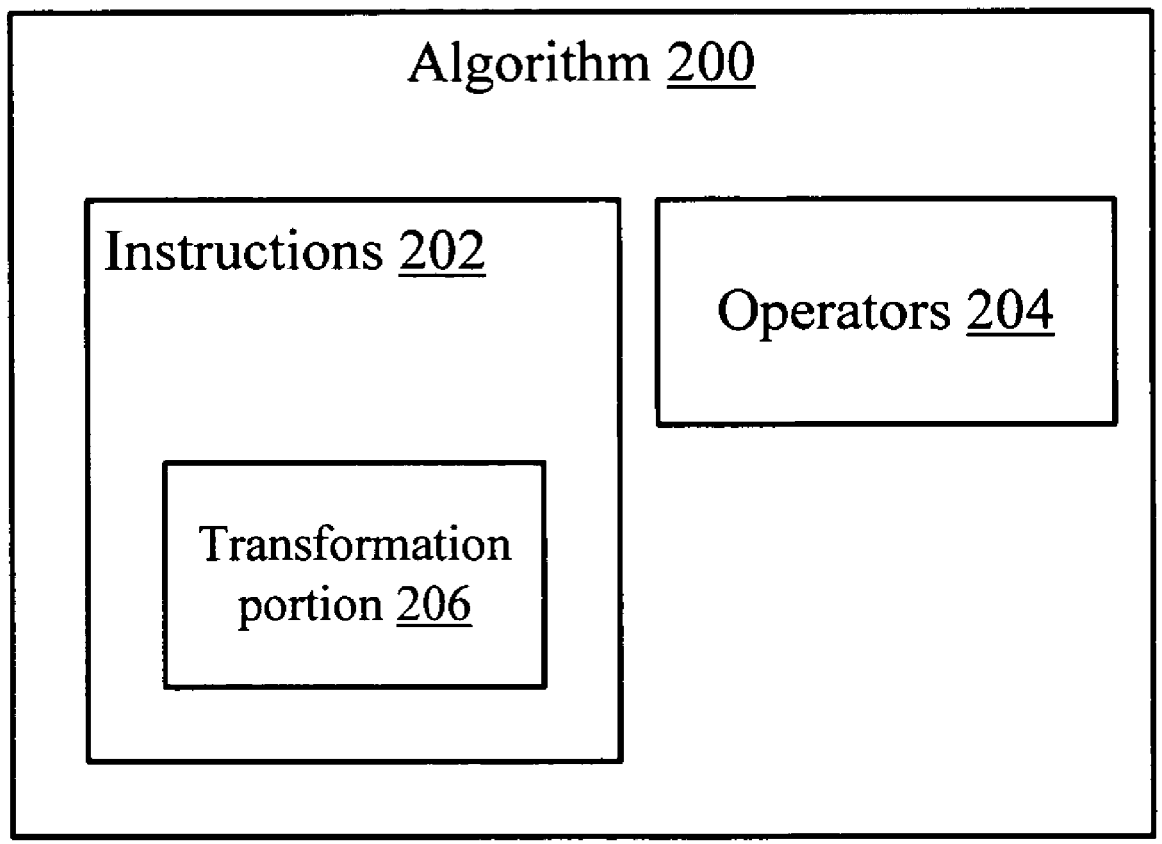
FIG. 2 shows a block diagram of an algorithm for performing encryption.

FIG. 2 shows a block diagram of an algorithm for performing encryption. Algorithm 200 may include one or more instructions 202, one or more operators 204, and transformation portion 206. In other embodiments, algorithm 200 may not have all of the components listed above or may have other components instead of and/or in addition to those listed above.

Algorithm 200 may be an embodiment of encryption algorithm 104 and/or reconstitution algorithm 114. Instructions 202 are steps carried out to encrypt unencrypted message 102 and/or reconstitute encrypted message 108. Instructions 202 may reference operators 204 and/or cause operators 204 to be implemented. For example, in an embodiment, instructions 202 reference one or more of operators 204, and each reference to one of operators 204 may cause that operator to be implemented. In one embodiment, one or more of operators 204 have an inverse. In an embodiment, using operators that have inverses facilitates building algorithm 200 such that it can be inverted, by allowing algorithm 200 to be built from the inverse of those of operators 204 that were used for encrypting unencrypted message 102. In another embodiment, one or more of operators 204 obey the commutative law. In an embodiment, using operators that obey the commutative law facilitates decrypting a message by applying at least some of the decryption operators in different order than the corresponding encryption operations were performed.

In an embodiment, operators 204 have the properties of obeying the associative law, the commutative law, and the identity laws. Obeying the identity law implies the operator operates on a group of elements (e.g., numbers or matrices) in such a manner that one of the elements functions as an identity element. Using operators that obey the commutative law, identity law, inverse law, and associative law facilitates building reconstitution algorithm 114 from the inverse operations of the operations that make up encryption algorithm 104, such that reconstitution algorithm 114 is an inverse of algorithm 104. Additionally, reconstitution algorithm 114 may be the same algorithm as encryption algorithm 104, which may be its own inverse.

One example of an embodiment of operators 204 is the exclusive-or operator. The exclusive-or operator is represented by the symbol $\oplus$. The exclusive-or is a binary operator that is defined in TABLE 1, which is discussed further below in conjunction with FIG. 3.

An extension of the exclusive-or $\oplus$ operator, which will be referred to as the n-dimensional exclusive-or $\oplus$, is obtained by applying the exclusive-or $\oplus$ one bit at a time to corresponding bits of two series of bits.

Specifically, suppose $A=(a_1, a_2, a_3, \ldots, a_n)$ and $B=(b_1, b_2, b_3, \ldots, b_n)$, where the symbol n represents a natural number, such that for each i satisfying $1 \leq i \leq n$, the variable $a_i$ is either 0 or 1 and the variable $b_i$ is either 0 or 1. The variables $a_i$ and $b_i$ are elements of the set of binary elements $\{0, 1\}$, and are sometimes called bits. A and B are elements of the set $\{0, 1\}^n$, which is the n-fold Cartesian product of the set of binary elements $\{0, 1\}$. The set $\{0, 1\}^n$, will be referred to as an n-dimensional bit space. The n-dimensional exclusive-or $\oplus$ on the n-dimensional bit space $\{0, 1\}^n$ is a function $\oplus: \{0, 1\}^n \times \{0, 1\}^n \to \{0, 1\}^n$. In other words, the n-dimensional exclusive-or $\oplus$ is an operator on the n-dimensional bit space $\{0, 1\}^n$ that maps two elements of the n-dimensional bit space $\{0, 1\}^n$ to another element of the n-dimensional bit space $\{0, 1\}^n$. The binary operator $\oplus$ on the n-dimensional bit space $\{0, 1\}^n$ is defined as $A \oplus B = (a_1 \oplus b_1, a_2 \oplus b_2, a_3 \oplus b_3, \ldots, a_n \oplus b_n)$ where each expression $a_i \oplus b_i$ is defined by TABLE 1, FIG. 3. The first coordinate of $A \oplus B$ may be $a_1 \oplus b_1$, and the nth coordinate of $A \oplus B$ may be $a_n \oplus b_n$. Elements of the n-dimensional bit space $\{0, 1\}^n$ are sometimes called bit strings of length n.

As an example of applying the exclusive-or on the n-dimensional bit space $\{0, 1\}^n$, suppose A=00011011 and suppose B=01010101. Applying the n-dimensional exclusive-or, the result of $A \oplus B$ is $A \oplus B = 01001110$. TABLE 2, FIG. 4 demonstrates how the n-dimensional exclusive-or $\oplus$ is the exclusive-or applied on a bit-by-bit basis.

To succinctly state some of the laws that hold for the exclusive-or $\oplus$ on the n-dimensional bit space $\{0, 1\}^n$, the symbol $\tilde{O}$ is used to denote the bit string consisting of a zero in every coordinate. In other words, the symbol $\tilde{O}$ denotes (0, 0, 0, . . . , 0).

The exclusive-or $\oplus$ when applied on the n-dimensional bit space $\{0, 1\}^n$ also obeys the commutative law, inverse law, identity law, and associative law. In other words, for any bit two strings $A=(a_1, a_2, a_3, \ldots, a_n)$ and $B=(b_1, b_2, b_3, \ldots, b_n)$, in which for each i, the elements $a_i$ and $b_i$ lie in the set $\{0, 1\}$, the commutative law is $A \oplus B = B \oplus A.$ Similarly, for any three bit strings $A=(a_1, a_2, a_3, \ldots, a_n)$, $B=(b_1, b_2, b_3, \ldots, b_n)$, and $C=(c_1, c_2, c_3, \ldots, c_n)$, in which for each i, the elements $a_i$, $b_i$ and $c_i$ lie in the set $\{0, 1\}$, the associative law is $(A \oplus B) \oplus C = A \oplus (B \oplus C).$ Further, for any bit string $A=(a_1, a_2, a_3, \ldots, a_n)$, in which for each i, the element $a_i$ lie in the set $\{0, 1\}$, the inverse law holds, which is $A \oplus A = \tilde{O},$ and, the identity law holds, which is $A \oplus \tilde{O} = \tilde{O} \oplus A = A.$ Another example of an embodiment of operators 204 is the biconditional operator. The biconditional operator, may be represented by $\leftrightarrow$, and operates on $\{0, 1\}^n$ as follows. The biconditional operator $\leftrightarrow$ on $\{0, 1\}$, is defined in TABLE 3, FIG. 5.

Similar to the above definition for the n-dimensional exclusive-or $\oplus$ on the n-dimensional bit space $\{0, 1\}^n$, the n-dimensional biconditional operator $\leftrightarrow$ on the n-dimensional bit space $\{0, 1\}^n$ may be defined as $\leftrightarrow: \{0, 1\}^n \times \{0, 1\}^n \to \{0, 1\}^n$. In other words, the n-dimensional biconditional operator maps two elements of the n-dimensional bit space $\{0, 1\}^n$ to another element of the n-dimensional bit space $\{0, 1\}^n$. For any two bit strings $A=(a_1, a_2, a_3, \ldots, a_n)$ and $B=(b_1, b_2, b_3, \ldots, b_n)$ that lie in the n-dimensional bit space $\{0, 1\}^n$, the n-dimensional biconditional operator is defined as $A \leftrightarrow B = (a_1 \leftrightarrow b_1, a_2 \leftrightarrow b_2, a_3 \leftrightarrow b_3, \ldots, a_n \leftrightarrow b_n)$.

The symbol $\tilde{1}$, lying in $\{0, 1\}^n$, may be used to denote the bit string consisting of a 1 in every coordinate. In other words, the symbol $\tilde{1}=(1, 1, 1, \ldots, 1)$. With $\tilde{1}$ as the identity element of the n-dimensional biconditional operator, the n-dimensional biconditional operator $\leftrightarrow$ also obeys the commutative law, inverse law, identity law, and associative law. In other words, for any two bit strings $A=(a_1, a_2, a_3, \ldots, a_n)$ and $B=(b_1, b_2, b_3, \ldots, b_n)$, where for each i, the elements $a_i$ and $b_i$ lie in the set $\{0, 1\}$, the commutative law holds for the biconditional operator, which is $A \leftrightarrow B = B \leftrightarrow A.$ For any three bit strings $A=(a_1, a_2, a_3, \ldots, a_n)$, $B=(b_1, b_2, b_3, \ldots, b_n)$, and $C=(c_1, c_2, c_3, \ldots, c_n)$, where for each i, the elements $a_i$, $b_i$ and $c_i$ lie in $\{0, 1\}$, the associative law holds, which is $(A \leftrightarrow B) \leftrightarrow C = A \leftrightarrow (B \leftrightarrow C).$ Similarly, for any bit string $A=(a_1, a_2, a_3, \ldots, a_n)$, where for each i, the element $a_i$ lies in the set $\{0, 1\}$, the Inverse law holds, which is $A \leftrightarrow A = \tilde{1},$ and the identity law holds, which is $A \leftrightarrow \tilde{1} = \tilde{1} \leftrightarrow A = A.$ A string of bits may be used to open and/or close a lock that is opened by at least encrypting and/or decrypting information, respectively. In this specification, the term "lock" and "encryption" are used interchangeably except where indicated otherwise. In the n-dimensional exclusive-or $\oplus$ example and the n-dimensional biconditional operator $\leftrightarrow$ example, the commutative, associative, inverse, and identity laws enable one or more parties, each holding their own bit string(s) (e.g., lock(s)), to apply encryption operations in one order and decryption operations in another order and/or to change the order in which a combination of encryption and decryption operations are performed without altering the resulting reconstituted message as long as a corresponding decryption (e.g., an inverse) operation was applied for each encryption operation that was applied.

The exclusive-or and the biconditional operators are just two examples of operators that may open and close locks based on a bit string. Any other operator having the commutative, associative, inverse, and identify law may open or close locks based on a bit string. Additionally, other operators that do not necessarily satisfy these laws may also be used to open and/or close locks based on a bit string or another set of characters.

Other operators may also be included within operators 204. The symbol "•" will be used to represent an arbitrary operator. The operator • is generic to the exclusive-or operator, the biconditional operator, and all other operators. Other examples of operators that may be included in operators 204 is an operator • on an n-dimensional bit space $\{0,1\}^n$. In other words, the operator • may be an arbitrary combination of biconditional and exclusive-or operators (which operate on bits). For example, •=($\leftrightarrow,\leftrightarrow,\oplus,\leftrightarrow,\oplus,\leftrightarrow,\leftrightarrow,\oplus,\oplus,\oplus,\oplus,\leftrightarrow,\oplus,\leftrightarrow,\leftrightarrow$), where n=15.

A nonempty set G is said to be a group if there is a binary operator • on G such that the four properties always hold:
(i) Closure Law: For any elements a, b in G, then a•b lies in G.
(ii) Associative Law: For any elements a, b, c in G, then (a•b)•c=a•(b•c)
(iii) Existence of an Identity Element: There exists an element e in G such that are a•e=e•a=a for every element a in G.
(iv) Every element has an inverse element: For any element a in G, there exists an element d in G such that a•d=d•a=e. The element d is called the inverse of a in G. The inverse of a is often written as $a^{-1}$.

A commutative group G also satisfies the commutative law: For any elements a, b in G, then a•b=b•a.

Operators that induce a commutative group of transformations enable a lock to be opened at a later time even if there are other locks on the message. The operators formed from combinations of the biconditional and exclusive-or operators induce a commutative group of transformations where the inverse of transformation •K equals transformation •K. As a specific example of decrypting a message by reapplying the encryption transformation a second time, let M=0110 1011, let •=($\oplus,\oplus,\oplus,\oplus,\leftrightarrow,\leftrightarrow,\leftrightarrow,\leftrightarrow$) and let K=0011 1100. Sending machine 106 transmits encrypted message M•K=0101 1000 to receiving machine 112. Receiving machine 112 receives M•K=0101 1000, and computes (M•K)•K, which equals M.

Additionally, although the above operators included within operators 204, act on bits or bit strings, operators may be used that operate on sets of base 10, octal, hexadecimal, or base n numbers, where n can be any number. Similarly, operators that operate on other characters, letters, and/or symbols may also be used.

Transformation portion 206 is a portion of code and/or a portion of hardware that transforms a message into a different representation. Transformation portion 206 may be used for encrypting a message. Transformation portion 206 may be an algorithm that produces a transformation or may be a software interface to hardware that produces a transformation. Transformation portion 206 may use random numbers that are generated by software and/or by hardware. If the random numbers are generated by software, the random number generator may be incorporated within transformation portion 206, or transformation portion 206 may be software and/or hardware that uses random numbers generated by an external random number generator.

For each key A, which may be a bit string, the symbol A• represents a transformation of the message M to an encrypted message A•(M). In this specification, the transformation •A may be substituted for the transformation A• and vice a versa, wherever either transformation occurs, no matter whether the symbol A is used to represent the key or whether another symbol is used to represent the key. The transformation A• is produced by transformation portion 206. The choice of the symbol A• signifies a transformation on the space of messages. For example, A• may equal A$\oplus$ or A$\leftrightarrow$.

For a bit string A, there are numerous transformations besides A$\leftrightarrow$ and A$\oplus$, which may be performed by transformation portion 206, depending on the specific embodiment. For A=($a_1, a_2, a_3, \ldots, a_n$) one example of a transformation that an embodiment of transformation portion 206 may perform is $S_A: \{0, 1\}^n \rightarrow \{0, 1\}^n$, which is defined as $S_A(M)=(m_1 \oplus a_1, m_2 \oplus a_2, m_3 \leftrightarrow a_3, \ldots, m_n \leftrightarrow a_n)$ where the message M=($m_1, m_2, m_3, \ldots, m_n$). Another example of a transformation that an embodiment of transformation portion 206 may perform is $T_A: \{0, 1\}^n \rightarrow \{0,1\}^n$, which is defined as $T_A(M)=(m_1 \leftrightarrow a_1, m_2 \oplus a_2, m_3 \oplus a_3, \ldots, m_n \oplus a_n)$. For the bit string A, there are numerous other transformations (that transformation algorithm 206 may perform), which may be formed creating permutations of sequences of any number of operators. In a similar way, for a different bit string B=($b_1, b_2, b_3, \ldots, b_n$) and for any other bit string, there are numerous transformations besides B$\leftrightarrow$ and B$\oplus$.

There are numerous bit strings of length n that may be used to form a transformation that is performed by transformation portion 206. For example, when n=32, there are $2^{32}$=4,294,967,296 different possible bit strings of length 32, and when n=128, there are $2^{128}$ different possible bit strings of length 128. Any of the possible bit strings may be used by transformation portion 206 to form a transformation.

The transformations of transformation portion 206 may be composed of several transformations in which each transformation is performed on the result of another transformation, such as B$\oplus$(A$\oplus$(M)) or B$\oplus$(A$\leftrightarrow$(M)). Since there are numerous transformations, the symbol S will be used to denote a transformation of a message M. The transformation of the message M may be written as S(M). Suppose T is another transformation. The transformation of M by S, followed by the transformation T, may be written as T∘S(M). The symbol represents the composition of two transformations, by taking two transformations S and T, and creating a new transformation T∘S. The identity transformation, denoted as $\bar{I}$, maps any message M to itself. In this function notation the identity transformation operating on message M may be written as, $\bar{I}$(M)=M. In other words, for any transformation T, then T∘$\bar{I}$=$\bar{I}$∘T=T; this is the identity law for transformations.

A transformation T has an inverse transformation, denoted as $T^{-1}$, if $T^{-1}$∘T=T∘$T^{-1}$=$\bar{I}$, which is called the inverse law. Two transformations S and T obey the commutative law if T∘S=S∘T. Finally, the transformations R, S, and T obey the associative law if R∘(S∘T)=(R∘S)∘T). A set of transformations may be said to be closed under a particular operator if application of the operator to two or more elements of the set results in another element of the set. Transformation portion 206 will be discussed further in conjunction with transformation module 616 of FIG. 6.

FIG. 3 shows TABLE 1, which is a truth table for the exclusive-or operator. FIG. 3 shows TABLE 1, which includes columns a, b, a$\oplus$b, and b$\oplus$a. Column a shows possible values for bit a. Column b shows possible values for bit b. Column a$\oplus$b shows the result of applying the exclusive-or operator to bits a and b when bit a has the value shown in column a and bit b has the value shown for bit b. Each row of TABLE 1 represents a different possible combination of values of bits a and b. Since there are four possible combinations of values for bits a and b there are four rows. TABLE 1 shows that whenever bits a and b have the same value, the quantity a⊕b has the value 0, and whenever bits a and b have different values, the quantity a⊕b has the value 1. TABLE 1 also shows that a⊕b and b⊕a always have the same value, and consequently the exclusive-or operator is commutative.

FIG. 4 shows TABLE 2, which shows an example of a n-dimensional exclusive-or ⊕, which is formed by a bitwise application of the exclusive-or operator. TABLE 2 has rows A, B, and A⊕B. Row A shows the value of each bit that constitutes message A. Row B shows each bit that constitutes message B. Row A⊕B shows each bit value of the message A⊕B. Corresponding bits of message A, message B, and message A⊕B are located in the same column. The value of any given bit of A⊕B, which is located in a particular column of TABLE 2, is computed by taking the exclusive-or of the corresponding bit of message A and the corresponding bit of message B (which share the same column as the bit of A⊕B being computed).

Figure 5:
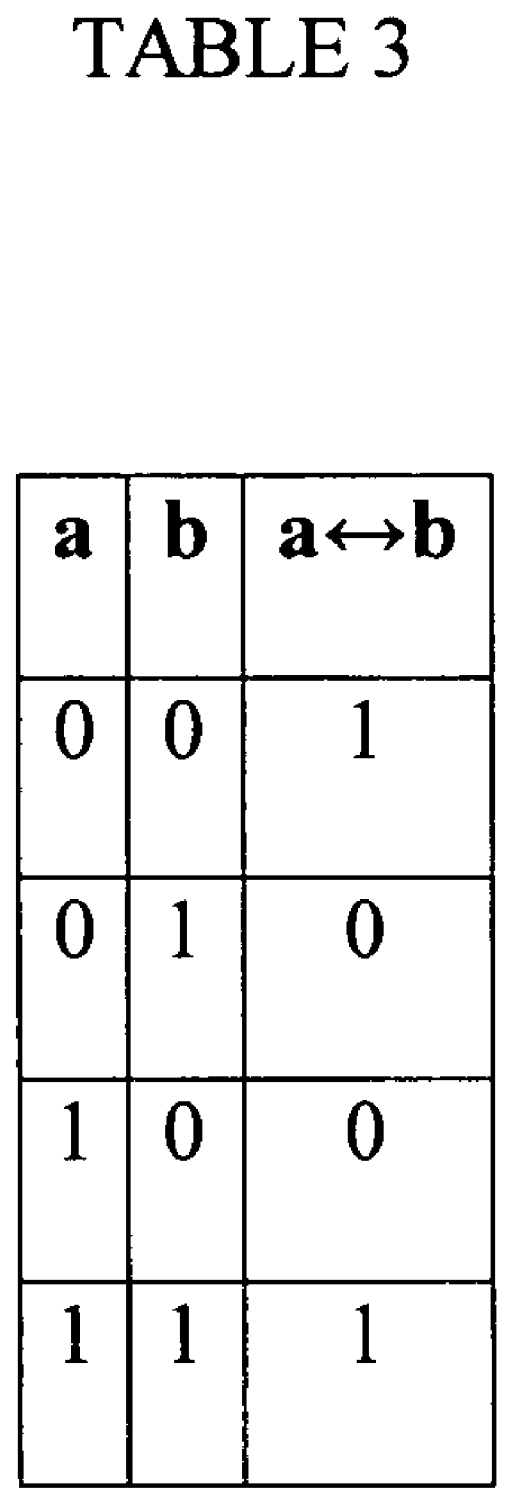

FIG. 5 shows TABLE 3, which is a truth table for the biconditional operator. TABLE 3 includes columns a, b and a↔b. Column a shows possible values for bit a. Column b shows possible values for bit b. Column a↔b shows the result of applying the biconditional operator to bits a and b when bit a has the value shown in column a and bit b has the value shown for bit b. Each row of TABLE 3 represents a different possible combination of values of bits a and b. Since there are four possible combinations of values for bits a and b there are four rows. TABLE 3 shows that whenever bits a and b have the same value, the quantity a↔b has the value 1, and whenever bits a and b have different values, the quantity a↔b has the value 0. Thus, the value of the quantity a↔b may also be obtained by taking the complement of the value of the quantity a⊕b. In other words, for a given set of values of bits a and b, if a↔b has the value 1, then a⊕b has the value 0. Similarly, for a given set of values of bits a and b, if a↔b has the value 0, then a⊕b has the value 1.

Figure 6:
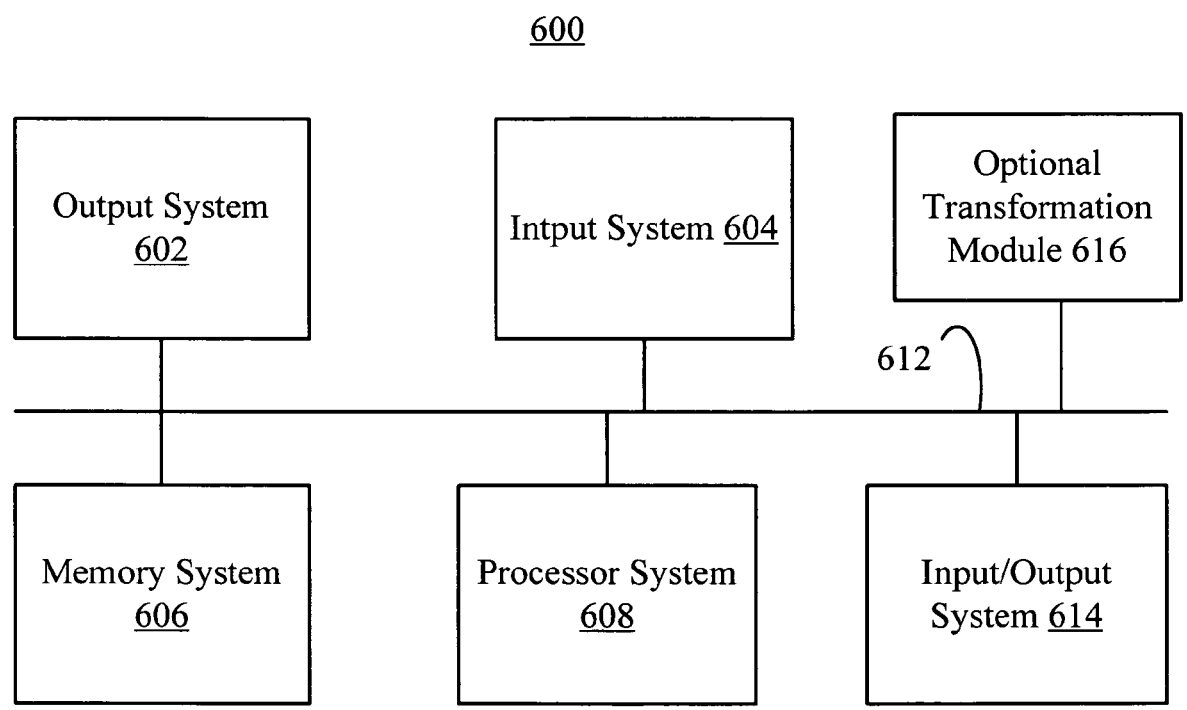
FIG. 6 shows a block diagram of a machine that may be an embodiment of a message machine, which could be used as the sending machine or receiving machine of FIG. 1.

FIG. 6 shows a block diagram of a machine 600, which may be an embodiment of sending machine 106 and/or receiving machine 112. Machine 600 may include output system 602, input system 604, memory system 606, processor system 608, communications system 612, input/output device 614, and optional transformation module 616. In other embodiments, machine 600 may not have all of the components listed above, or may have other components in addition to and/or instead of those listed above.

Output system 602 may include any one of, some of, any combination of, or all of a monitor system, a handheld display system, a printer system, a speaker system, a connection or interface system to a sound system, an interface system to peripheral devices and/or a connection and/or interface system to a computer system, an intranet, and/or the Internet, for example.

Input system 604 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, Local Area Network (LAN), Wide Area Network (WAN) and/or the Internet (e.g., IrDA, USB), for example.

Memory system 606 may include, for example, any one of, some of, any combination of, or all of a long term storage system, such as a hard drive; a short term storage system, such as random access memory; a removable storage system, such as a floppy drive or a removable drive; and/or flash memory. Memory system 606 may include one or more machine-readable mediums that may store a variety of different types of information.

Processor system 608 may include any one of, some of, any combination of, or all of multiple parallel processors, a single processor, a system of processors having one or more central processors and/or one or more specialized processors dedicated to specific tasks. Communications system 612 communicatively links output system 602, input system 604, memory system 606, processor system 608, and/or input/output system 614 to each other. Communications system 612 may include any one of, some of, any combination of, or all of electrical cables, fiber optic cables, and/or a transmitter for sending signals through air or water (e.g. wireless communications), or the like. Some examples of a transmitter for sending signals through air and/or water include systems for transmitting electromagnetic waves such as infrared and/or radio waves and/or systems for sending sound waves.

Input/output system 614 may include devices that have a dual function as input and output devices. For example, input/output system 614 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 614 is optional, and may be used in addition to or in place of output system 602 and/or input system 604.

Transformation module 616 produces the transformation used by transformation portion 206 of algorithm 200 in embodiments in which transformation portion 206 uses results of a hardware produced transformation. A property of a transformation is its unpredictability or randomness. Transformation module 616 may include a random number generator or random event generator for producing the element of randomness used by transformation portion 206 and/or transformation module 616 to produce the resulting transformation. In this specification, the term "perfect secrecy" refers to a message for which the number of possible transformations is at least as large as the number of possible messages. In other words, perfect secrecy is obtained when the a posteriori probability of a finding a particular encrypted message representing various messages is the same as the a priori probability of guessing the same messages before the interception. In other words, possession of the encrypted message does not increase the probability of guessing what the unencrypted message is.

There are numerous hardware, software, and hardware/software hybrids that may be used for transformation module 616, transformation portion 206 and/or the combination of transformation portion 206 and transformation module 616 that are at least in theory capable of generating transformations that have perfect secrecy. Transformation module 616 may include a random event generator. In this specification, a random event generator is generic to a random number generator, because the generation of a number is an event, and if the value of the number is random then the event is a random event. In one embodiment, transformation module 616 may include a hardware device that places two Metal Insulator Semiconduction Capacitors (MISC) in close proximity. The random bit may be determined by the difference in charge between the two MISCs (see Agnew, G. B. (1988) "Random Source for Cryptographic Systems," *Advances in Cryptology—EUROCRYPT* 1987 *Proceedings*, Springer-Verlag, pp. 77-81, which is incorporated herein by reference).

In another embodiment, transformation module 616 may include one or more Application Specific Integrated Circuit (ASIC) chips that are designed for generating random bits. In an embodiment, transformation module 616 may include a Multiple Lock Cryptography (MLC) that is integrated in hardware within a random bit ASIC chip.

Although in FIG. 6 transformation module 616 is a separate unit from memory system 606, transformation module 616 may be a portion of code stored within memory system 606 or may be integrated within processor system 608. Transformation module 616 may include an ASIC chip having at least software within which a MLC is integrated, providing random bit strings.

In one embodiment, transformation module 616 includes a hardware random number generator that uses thermal noise inside the processor or another chip to produce random circuit transitions (e.g., transitions between different states of the circuit, which may be based on different states of one or more transistors or other circuit component). A software driver (which may be included within transformation portion 206) can use the thermal noise to generate random bit streams to security applications. For example, a software driver (e.g., transformation portion 206) may aggregate the transitions in the states of the circuit and assemble the transitions into a random key of any desired length, which may be used for security applications. An example of a random number generator based on thermal noise is Intel's 820 chipset, which may be included within, or may be, transformation module 616.

In another embodiment, transformation portion 206 and/or transformation module 616 collects hardware statistical data associated with one or more chips of a computer. The statistical data is then used to produce unbiased random bit strings. For example, PCQNG 2.0 Windows product and J1000KU made by ComScire may be included within transformation portion 206 and/or transformation module 616, and used to produce a random bit stream.

In another embodiment, transformation module 616 uses quantum mechanical properties of a physical system to generate randomized bit values. Using quantum processes to generate random bit values may be accomplished in many different ways. For example, the quantum mechanical properties of silicon may be used to create a random number generator. As an example of using the quantum mechanical properties of silicon, Intel's Celeron chip may be included within transformation module 616, which provides a hardware random number generator using thermal noise generated by the quantum mechanical properties of silicon.

In another embodiment, transformation module 616 may include a quantum random number generator that uses quantum optics to generate random bits. For example, photons are sent one photon at a time (or in another manner in which individual photons may be tagged and/or tracked) to a semitransparent mirror. If the photon is reflected, then the next bit is set to a first value. In contrast, if the photon is transmitted, then the next bit is set to a second value. Quantum number generators using quantum optics are available from Quantis.

In another embodiment, transformation module 616 may include one or more proteins that flip between two or more conformations, which can be used to generate random numbers. For example, next bit value may be assigned based on which conformation the protein is at a given interval of time or based on the relative length of time the protein is in one conformation versus another conformation. As an example, transformation module 616 may include ion-selective proteins, sometimes called sodium channels and potassium channels, spanning a cell membrane, which flip between a closed and an open conformation.

In another embodiment, transformation portion 206 and/or transformation module 616 may include tables of random numbers, such as the RAND tables, generated by the RAND Corporation. Using an appropriate indexing system, tables of random numbers, such as the RAND tables, enable transformation portion 206 and/or transformation module 616 to generate random numbers.

In another embodiment, transformation portion 206 and/or transformation module 616 may periodically and/or randomly change the cryptographic method being used. In an embodiment, transformation portion 206 and/or transformation module 616 of sending machine 106 and of receiving machine 112 may or may not inform one another of the type of cryptographic method the other party is using. Each party also may or may not know when the other party decides to change the key in use or change the cryptographic method in use, while the message is being transmitted.

There are numerous other ways of changing the encryption method. For example, the sender may use 128-bit DES to encrypt bit strings for the first half of a message sent and then change the 128-bit key used in DES after transmitting every 900 bytes of the message. For the second half of the message, the sender may use a key that is 256-bit AES to generate bit strings. The receiver may use 256-bit AES to generate bit strings for the first third of the message received, and then switch to 256-bit Non-Autonomous Dynamical Orbit Cryptography (NADO) for generating bit strings for the last two thirds of the message received (see U.S. patent application Ser. No. 10/693,053, Publication No. US-2004-0228480-A1, cited above). Additionally, the size of the bit strings may be changed and the times at which the encryption method is changed may be changed.

In another embodiment, transformation portion 206 and/or transformation module 616 may implement a non-autonomous dynamical system. Specifically, an iterative autonomous dynamical system is created by a function $f: X \rightarrow X$, which operates on an element of the set X and outputs another element of the set X. An initial element is chosen. The elements x of the set X may be a collection of coordinates, such as points. In the provisional application, Ser. No. 60/679,169, the word "point" is used to refer to any type of element (not just points). In this specification, the term "iteration" is used to refer to a process that is repeated multiple times, each time being applied to the results of the last application of the process. The iteration of $f$ on x creates a sequence of points, $[x, f(x), f \circ f(x), f \circ f \circ f(x), \ldots]$. This sequence of elements is called the orbit of x with the function $f$. The initial element $[x, f(x), f \circ f(x), f \circ f \circ f(x), \ldots]$ may be referred to as an orbit element or orbit point if the element is a point. It is also possible to create a sequence of elements using a sequence of functions $[f_1, f_2, f_3, f_4, \ldots]$, rather than a single function. For each number i, the iteration of each function $f_i$ on an initial orbit element x creates a sequence of elements, $[x, f_1(x), f_2 \circ f_1(x), f_3 \circ f_2 \circ f_1(x), f_4 \circ f_3 \circ f_2 \circ f_1(x), \ldots]$. As the system is iterated, if the function applied sometimes changes, then the sequence of elements form an iterative non-autonomous dynamical system (see Fiske, Michael (1996) "Non-autonomous dynamical systems applied to neural computation," Ph.D. Thesis, Northwestern University, which is incorporated herein by reference).

An iterative autonomous dynamical system is a special case of a non-autonomous dynamical system. If all the f in the sequence of functions $[f_1, f_2, f_3, f_4, \ldots]$, represent the same function, then this is the definition of an autonomous dynamical system.

The orbit [x, $f_1(x)$, $f_2 \circ f_1(x)$, $f_3 \circ f_2 \circ f_1(x)$, $f_4 \circ f_3 \circ f_2 \circ f_1(x)$, ...] can generate an unpredictable sequence of bit values, such as 0's and 1's, in more than one way. One way to choose the bit values is to apply a function to two consecutive elements in the series that makes up the orbit and base the bit values on the relative value of two outputs of the application of the function to different pairs of elements. The function used will be referred to as a two-element-function, because it operates on two elements. The output of the two-element-function will be referred to as the magnitude of the two-element-function. Binary operators are a special case of two-element-functions. An example of a two-element-function that operates on two elements $X_1 = (x_{11}, x_{12}, \ldots x_{1n})$ and $X_2 = (x_{21}, x_{22}, \ldots x_{2n})$ of the set of coordinates of the points of an n dimensional space is the distance d between the points, which is the distance $$d = \sqrt{\sum_{i=1}^{n} (x_{1i} - x_{2i})^2}.$$

There are many other two-element-functions that may be used, such as $$d = \sum_{i=1}^{n} |x_{1i} - x_{2i}|, \quad d = \sqrt{\prod_{i=1}^{n} (x_{1i} - x_{2i})^2},$$

and $$d = \sum_{i=1}^{n} (x_{1i} x_{2i}).$$

If the magnitude of the two-element-function operating on the consecutive elements $f_1(x)$ and $\eta_2 \circ f_1(x)$ is greater than the magnitude of the two-element-function operating on the elements $f_2 \circ \eta_1(x)$ and $f_3 \circ f_2 \circ f_1(x)$, then a first value is chosen for the next bit. If the magnitude of the two-element-function operating on the elements $f_1(x)$ and $f_2 \circ f_1(x)$ is less than the magnitude of the two-element-function operating on the consecutive elements $f_2 \circ f_1(x)$, and $f_3 \circ f_2 \circ f_1(x)$, then the second value is chosen. If the two magnitudes of the two two-element-functions are equal, then neither the first nor the second value is chosen. In general, in this specification when two numbers are said to be equal the two numbers are equal within a tolerance. The tolerance may be determined by the accuracy of the computation being performed and/or the measuring device measuring the numbers. The tolerance may be determined by a customary tolerance to which such computations are performed. For example, when measuring or computing quantities two numbers may be considered equal when they are equal to within two or three significant digits. In another embodiment, two numbers may be considered equal when they are determined to be equal to within the limits of single or double precision computations (depending on the computation being performed).

The next bit value is chosen in a similar manner. Specifically, if the magnitude of the two-element-function operating on two consecutive elements $f_2 \circ f_1(x)$ and $f_3 \circ f_2 \circ f_1(x)$ is greater than the magnitude of the two-element-function operating on the two consecutive elements $f_3 \circ f_2 \circ f_1(x)$ and $f_4 \circ f_3 \circ f_2 \circ f_1(x)$, then the first value is chosen. If the magnitude of the two-element-function operating on consecutive elements $f_2 \circ f_1(x)$ and $f_3 \circ f_2 \circ \eta_1(x)$ is less than the magnitude of the two-element-function operating on consecutive elements $f_3 \circ f_2 \circ f_1(x)$ and $f_4 \circ f_3 \circ f_2 \circ f_1(x)$, then second value is chosen. If the magnitudes are equal, neither the first nor the second value is chosen. This process is repeated until enough bit values are chosen to make up the desired key.

In another embodiment, transformation portion 206 and/or transformation module 616 establish a subset A of X. If the element x lies in A, then a first value is chosen for the next bit. Otherwise, a second value is chosen for the next bit. Continuing this example, if $f_1(x)$ lies in A, then the first value is chosen for a second bit. Otherwise, the second value is chosen for the second bit. Similarly, if $f_2 \circ f_1(x)$ lies in A, then a first value is chosen for a third bit. Otherwise, the second value is chosen for the third bit. This process is repeated until enough bits are chosen to create a key.

In another embodiment, transformation portion 206 and/or transformation module 616 use a vector field on a manifold to create a random number generator. A smooth dynamical system is created by a vector field on a manifold (see Spivak, Mike (1979) Differential Geometry, Volume I, Publish or Perish, Inc., which is incorporated herein by reference).

If the function that defines the vector field does not change over time, then it is a smooth autonomous dynamical system. If the function that defines the vector field changes smoothly over time, then it is a smooth non-autonomous dynamical system. In a smooth autonomous dynamical system, one creates a sequence of unpredictable elements (e.g., points) [$p_1$, $p_2$, $p_3$, ...], by sampling the coordinates of the trajectory at successive times, such as $t_1 < t_2 < t_3$, and so on. An unpredictable sequence of bit values (e.g., 0's and 1's) are chosen based on the magnitudes of two-element-functions applied to elements [$p_1$, $p_2$, $p_3$, ...] in a similar way to a discrete dynamical system. If the magnitude of the two-element-function applied to elements $p_1$ and $p_2$ is greater than the magnitude of the two-element-function applied to elements $p_3$ and $p_4$, then a first value is chosen. If the magnitude of the two-element-function applied to elements $p_1$ and $p_2$ is less than the magnitude of the two-element-function applied to elements $p_3$ and $p_4$, then a second value is chosen. If the magnitudes are equal, neither the first nor the second value is chosen.

For the next bit value, if the magnitude of the two-element-function applied to elements $p_5$ and $p_6$ is greater than the magnitude of the two-element-function applied to elements $p_7$ and $p_8$, then a first value is chosen. If the magnitude of the two-element-function applied to elements $p_5$ and $p_6$ is less than the magnitude of the two-element-function applied to elements $p_7$ and $p_8$, then a second value is chosen. If the magnitudes of the two-element-functions are equal, neither value is chosen. This process is repeated until enough bit values are chosen to form a key.

In another embodiment, transformation portion 206 and/or transformation module 616 may use a hash function to amalgamate random information generated from one or more sources, including the ones mentioned above, and produce random numbers. Additional sources of random information may come from a standard computer environment, such as keystrokes, mouse commands, the sector number, time of day, and seek latency for every disk operation, actual mouse position, the number of the current scanline on the monitor, input from a microphone, the CPU load, contents of the file allocation tables, kernel tables and other operating system statistics, and the contents of the displayed image on the monitor.

In another embodiment, transformation portion 206 and/or transformation module 616 may use SHA-1, developed by the National Security Agency (NSA) and standardized by National Institute of Standards and Technology (NIST) as the hash function (see National Institute of Standards and Technology, (1995) Secure Hash Standard, FIPS PUB 180-1, Apr. 17, 1995, which is incorporated herein by reference). Other examples of hash functions that may be used are MD5, SHA-912, SHA-256, or SHA-384 (see Schneier, Bruce (1996), APPLIED CRYPTOGRAPHY, John Wiley & Sons, Inc., which is incorporated herein by reference).

In another embodiment, transformation portion 206 and/or transformation module 616 use devices that generate bit strings based on electromagnetic radiation in the local environment. There are a variety of ways of generating bit strings based on electromagnetic radiation in the local environment. In one embodiment, transformation module 616 includes at least two solar cells, which will be referred to as $Bit_0$ and $Bit_{-1}$. At a $1^{st}$ sampling time, if the voltage of cell Bit_0 is greater than the voltage of Bit_0 then the next random bit is a first value (e.g., 0 or 1). In contrast, if the voltage of cell Bit_0 is greater than the voltage of Bit_0 then the next bit is a second value (e.g., 1 or 0, respectively). However, at a $2^{nd}$ sampling time, if the voltage of cell Bit_0 is greater than the voltage of Bit_0 then the next random bit is the second value (e.g., 1 or 0). In contrast, if the voltage of cell $Bit_{-1}$ is greater than the voltage of $Bit_{-0}$ then the next bit is the first value (e.g., 0 or 1, respectively). For the $2^{nd}$ sample, the criterion of whether to assign the first or second value is reversed with respect to the first sampling in case there is a bias toward one cell having a greater value versus another.

A rule that may be used for the $1^{st}$, $3^{rd}$, $5^{th}$ and all odd samples is if the voltage of cell Bit_0 is greater than the voltage of Bit_1 then the next random bit is the first value, while if the voltage of cell Bit_1 is greater than the voltage of Bit_0 then the next bit is the second value. A rule that may be used for the $2^{nd}$, $4^{th}$, $6^{th}$ and all even samples is if the voltage of cell Bit_0 is greater than the voltage of Bit_1 then the next random bit is the second value, while if the voltage of cell $Bit_{-1}$ is greater than the voltage of Bit_0 then the next bit is the first value.

In another embodiment, transformation portion 206 and/or transformation module 616 may use a Geiger counter to detect certain types of particles, which may be a result of radioactive decay. The time of any given decay is random, and consequently, the interval between two consecutive decays is also random.

Figure 7:
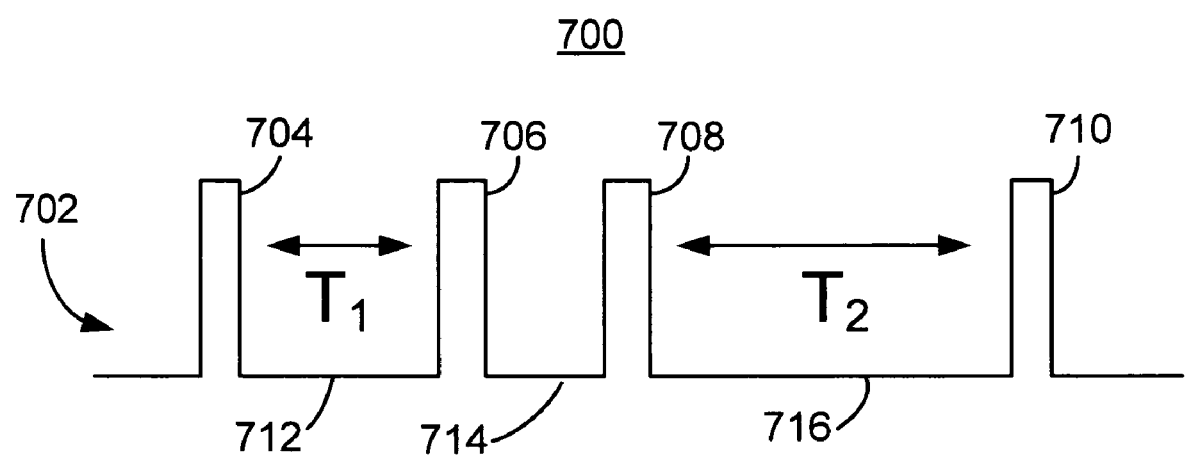
FIG. 7 shows an example of a timing diagram that illustrates using the random time intervals of a Geiger counter to generate bit values.

FIG. 7 shows a timing diagram 700 illustrating using the random time intervals of a Geiger counter, which may be included in transformation module 616, to generate the next bit value. Timing diagram 700 includes pulse train 702, which includes pulses 704, 706, 708, and 710, which are separated by time intervals 712, 714, and 716.

In timing diagram 700 of FIG. 7, pulses 704, 706, 708, and 710 correspond to the detection of certain types of particles. For example, pulses 704, 706, 708, and 710 may be caused by a particle entering a tube filled with a type of gas that is at least partially ionized by the particle, thereby creating a current that results in one of pulses 704, 706, 708, and 710. There are many types of Geiger counters, which are sensitive to different types of particles, such as photons and alpha particles, which are often associated with radioactive decay. Time interval 712, having length $T_1$, is the time elapsed between two consecutive pulses 704 and 706, time interval 714, is the time elapsed between pulses 706 and 708, and time interval 716, having length $T_2$, is the time elapsed between the next two consecutive pulses 708 and 710. In the provisional application, Ser. No. 60/679,169, the detection of a pulse and/or the pulse itself is referred to as radioactive decay or as the decay of a particle, because the pulses are associated with the detection of particles that are usually associated with radioactive decay. However, a Geiger counter may be used to generate random numbers, as in conjunction with FIG. 7, whether or not the particles detected result from radioactive decay or from some other source as long as the length of the time intervals between detecting particles is random.

In an embodiment, transformation portion 206 and/or transformation module 616 may determine the 1st random bit, wait until the next pulse occurs, and then measure the length of time interval 712, $T_1$, between the two pulses 704 and 706. Then wait for a second pair of pulses 708 and 710 and measure the length of interval 716, $T_2$, between pulses 708 and 710. If $T_1=T_2$, the next bit is not set to any value. Otherwise, if $T_1<T_2$, then set the value of the next bit to a first value (e.g., 0 or 1), while if $T_1>T_2$, set the value of the next bit to a second value (e.g., 1 or 0, respectively). In the provisional application, Ser. No. 60/679,169, setting the value of the next bit is often referred to as generating a bit.

To avoid a bias due to the counter or measuring process, the determination of a bit is reversed on the even bits. In particular, a rule that may be used for the $2^{nd}$, $4^{th}$, $6^{th}$, and all even bits is if $T_1=T_2$, the next bit is not set to any value. Otherwise, if $T_1<T_2$, then the next bit is set to a first value, while if $T_1>T_2$, the next bit is set to a second value.

A rule that may be used for the $1^{st}$, $3^{rd}$, $5^{th}$, and all odd bits is if $T_1=T_2$, do not set the value of any bits. Otherwise, if $T_1<T_2$, then set the value of the next bit to the second value, while if $T_1>T_2$, then set the value of the next bit to the first value. In another embodiment, time intervals 712 and 714 could be used for $T_1$ and $T_2$, respectively. In another embodiment, random numbers may be generated based on whether the number of particles detected in a given time interval is greater or less than a preset threshold. In several of the above methods of generating random bits, if two quantities are equal, the next bit is not set. However, in another embodiment, the first time the quantities are equal a first of two values is chosen for the next bit and the next time the one of two quantities are equal a second of two values is chosen. Alternatively, another sequence of bit values may be assigned to the next bit when the two quantities are equal. As long as the occurrences of the two quantities being equal are random and as long as there is not a significant bias for the two quantities to be equal (instead of being different), the resulting sequence of bits is expected to be at least substantially random.

Figure 8:
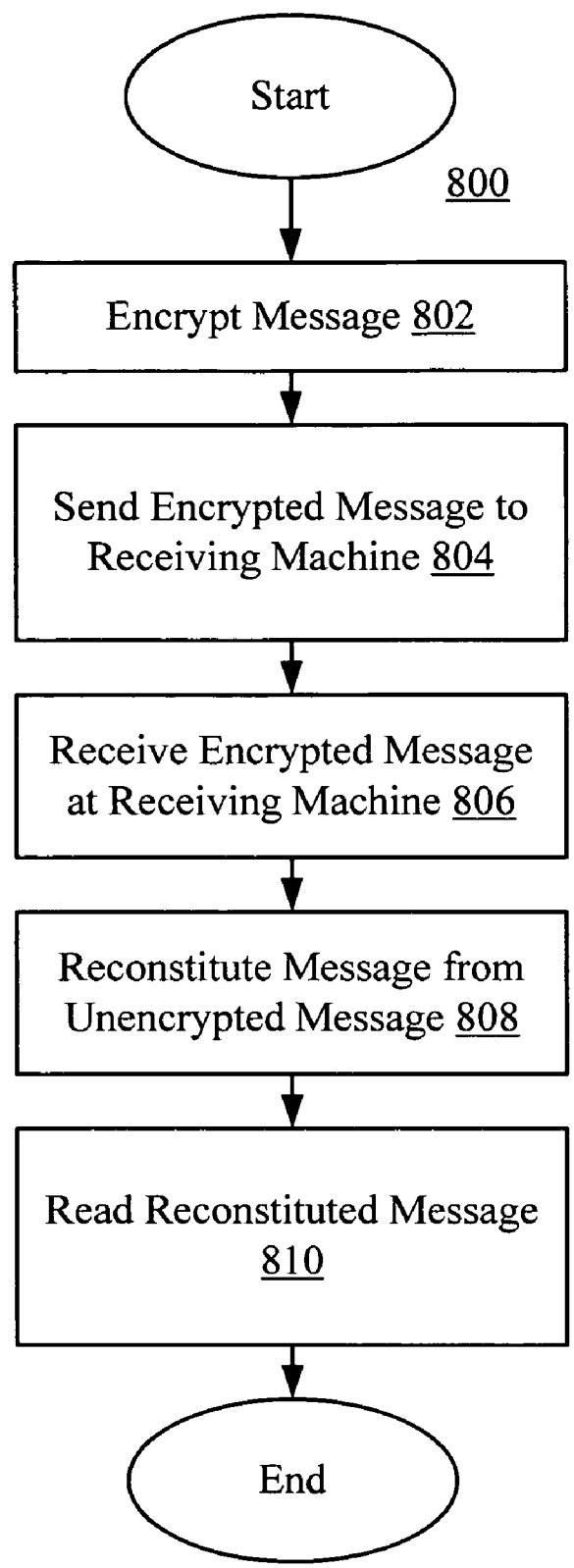
FIG. 8 shows a method for transferring information in which both the sender and receiver possess the same key prior to sending any messages.

FIG. 8 shows a method 800 for transferring information in which both the sending machine 106 and receiving machine 112 have the same key. Suppose sending machine 106 wants to securely transmit information to receiving machine 112. Sending machine 106 and receiving machine 112 already possess a key K that is thought to be unknown to an outsider. A method that may be used for transmitting key K from sending machine 106 to receiving machine 112 and/or from receiving machine 112 to sending machine 106 is discussed in conjunction with FIG. 19. In the embodiment of FIG. 8, collection of keys 105 and collection of keys 118 are the same key, which may be key K.

In step 802, sending machine 106 encrypts unencrypted message M (e.g., unencrypted message 102) with key K (of collection of keys 105). For example, sending machine 106 may use encryption algorithm 104 and collection of keys 105 to encrypt unencrypted message 102, by at least computing MEK, thereby forming encrypted message 108. Prior to, or as part of, step 802, unencrypted message 102 may have been generated at message machine 106 or entered into message machine 106 via a keyboard, electronic writing pad, mouse, LAN, WAN, telephone receiver, microphone USB device and/or other storage medium.

In step 804, sending machine 106 transmits encrypted message 108 (e.g., M•K) to receiving machine 112. For example, sending machine 106 transmits, via transmission path 110, encrypted message 108 to receiving machine 112.

In step 806, receiving machine 112 receives encrypted message 108. For example, receiving machine 112 receives M•K. In step 808, since receiving machine 112 knows key K, receiving machine 112 reconstitutes unencrypted message 102, such as by at least computing (M•K)•K, which equals M. Receiving machine 112 may use reconstitution algorithm 114 and collection of keys 118 to reconstitute unencrypted message 102 from encrypted message 108. Reconstitution algorithm 114 may decrypt encrypted message 108 by performing the inverse of the operations performed by encryption algorithm 104. Performing the inverse of the operations performed by encryption algorithm 104 may involve a second application of the same operations performed by encryption algorithm 104, such as by applying the transformation •K a second time. In step 810, receiving machine 112 reads message M. For example receiving machine 112 reads unencrypted message 102.

In step 810, the reconstituted message 116 is read. Step 810 may include performing instructions in reconstituted message 116 and/or outputting the reconstituted message 116, such as by displaying reconstituted message 116 on a display, storing reconstituted message 116 in a file, and/or printing out reconstituted message 116 on paper.

In an embodiment, if method 800 is repeated a new key K is distributed to sending machine 106 and receiving machine 112 (e.g., sending machine 106 sends the new key to receiving machine 112 or receiving machine 112 sends the new key to sending machine 106). In one embodiment, method 1900 is used to send a new key from sending machine 106 to receiving machine 112. Method 1900 is discussed in conjunction with FIG. 19. In another embodiment, the same key K may used for multiple messages. However, changing the key used is expected to be more secure than using the same key.

In an embodiment, the messages and keys sent are of the same length. In another embodiment, the message M that sending machine 106 wants to send to receiving machine 112 may be smaller than key K that is used to encrypt message M. If message M is smaller than key K, message M may be padded with data (e.g., message M may be padded with a string of 0's or other characters) so that the padded message M is the same size as key K.

In another embodiment, the message M, (e.g., unencrypted message 102, which is sent by sending machine 106 to receiving machine 112), may be greater than the length, denoted as L, of the smallest key in collection of keys 105 (e.g., message M may be larger than the largest key of collection of keys 105). For example, sending machine 106 may want to securely send to receiving machine 112 the contents of a CD-ROM, which contains 600 megabytes of data. If message M is longer than L, message M is divided into smaller message segments $M_1, M_2, \ldots, M_q$. In an embodiment of method 800, sending machine 106 and receiving machine 112 may share a set of keys $K_1, K_2, \ldots, K_q$ that are used for encrypting and sending message segments $M_1, M_2, \ldots, M_q$. It may be convenient for each message segment $M_j$ to be the same size as (or smaller than) L. The last message segment, $M_q$, or any message segment that is smaller than its corresponding key, may be padded with zeroes or some other sequence of data, so that the size of the last message segment $M_q$ (or any message segment $M_i$) is the same size as the last key $K_q$ (or the corresponding key $K_i$ used to encrypt message segment $M_i$). In other embodiments, method 800 may not contain all of the steps above, and/or may contain other steps in addition to or instead of those specified above. For example, method 800 may be performed by multiple modules in which each module performs only a part of method 800. In such an embodiment, each module performs a method that only includes some of method 800.

Figure 9:
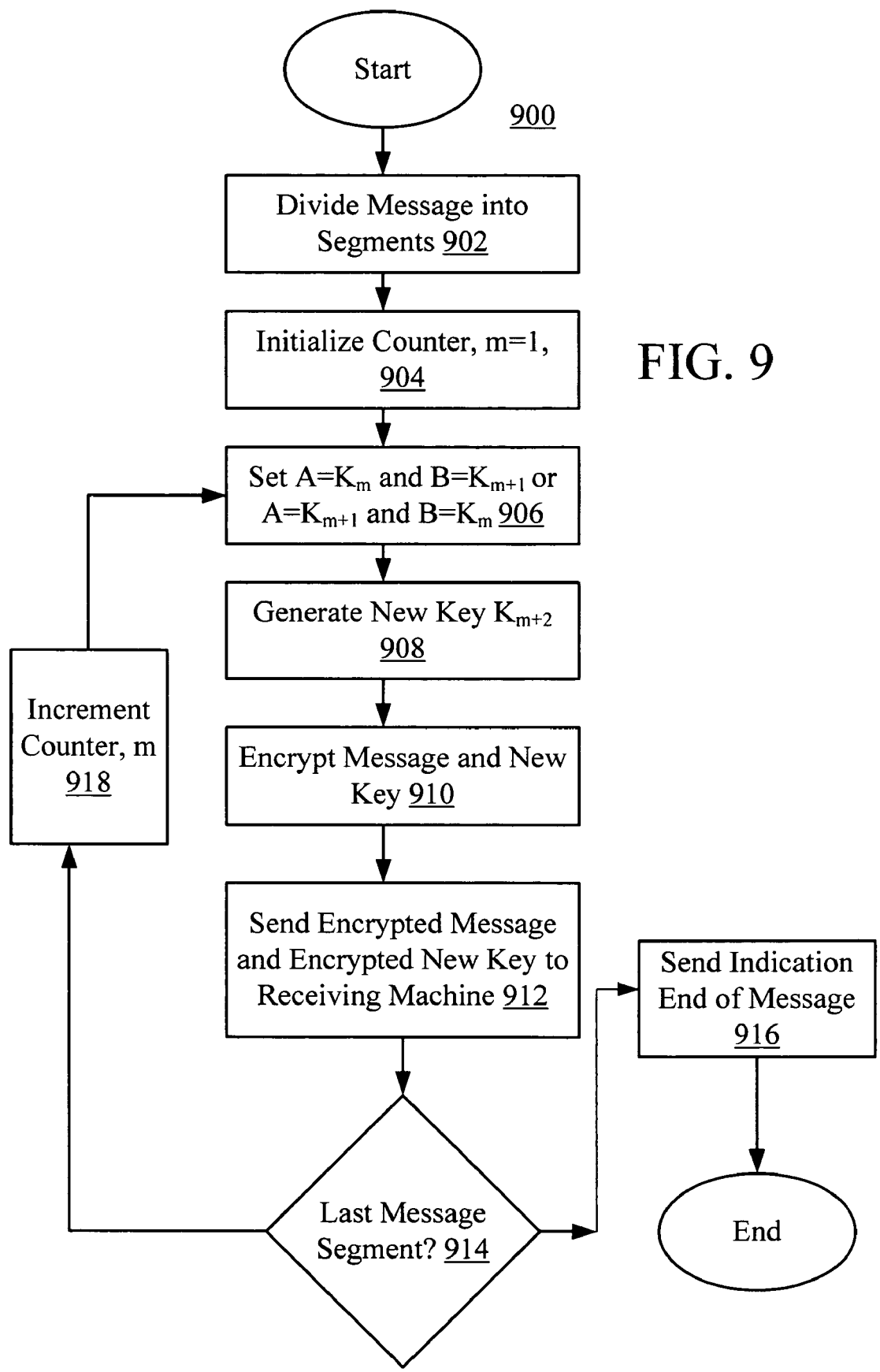
FIG. 9 is a method for encrypting and sending a message that is divided into message segments.

FIG. 9 is a method 900 for encrypting and sending a message that is longer than the size of the smallest key, generated by transformation module 206. In the embodiment of method 900, both sending machine 106 and receiving machine 112 have the same initial collection of keys 105, which is the same as collection of keys 118. A method that may be used for transmitting an initial set of keys, which may be all or some of collection of keys 105, from sending machine 106 to receiving machine 112 and/or for transmitting an initial set of keys, which may be all or some of collection of keys 118, from receiving machine 112 to sending machine 106 is discussed in conjunction with FIG. 19. Method 900 is performed at sending machine 106.

In step 902, message M is divided into message segments, such that $M=M_1, M_2, \ldots, M_q$. The index values of the counter, message segments, and keys that appear in this specification are not necessarily the index values that are used, but instead represent where in the sequence of index values each of the actual index values is located. For example, an index value of 1 refers to the first index value used, and the index value of 2 refers to the second index value used. However, the first index value used may be a 0 and the second index value used may be 5. The actual index values used may not even be numerical. Prior to, or as part of, step 902, unencrypted message 102 may have been generated at message machine 106 or entered into message machine 106 via a keyboard, electronic writing pad, mouse, LAN, WAN, telephone receiver, microphone, USB device and/or other storage medium. In step 904, sending machine 106 initializes a counter m equal to 1 or the first value of a sequence of index values.

Next in step 906, the sending machine 106 sets first key A equal to key $K_m$ (which when m=1 is key $K_1$), and sets second key B equal to key $K_{m+1}$ (which when m=1 is key $K_2$). It may be convenient to refer to new key $K_{m+1}$ as a "secret key." In an alternative embodiment, first key A is set equal to key $K_{m+1}$, and second key B is set equal to key $K_m$. In yet another embodiment, whether first key A is set to key $K_{m+1}$ or key $K_m$, and whether second key B is set to key $K_m$ or key $K_{m+1}$ may be dependent upon the current value of index m (e.g., whether m has an even or odd value).

In step 908, sending machine 106 generates a new key $K_{m+2}$ which can be created using transformation portion 206 and/or transformation module 616 as described above. When counter m=1, new key $K_{m+2}$, is $K_3$.

In step 910 the sending machine 106 encrypts message segment $M_m$ and new key $K_{m+2}$ by computing encrypted message segment $M_m•A$ and encrypted key $K_{m+2}•B$, respectively. In alternative embodiments, sending machine 106 may encrypt message segment $M_m$ and new key $K_{m+2}$ by computing encrypted message segment $M_m•A$ and encrypted key $K_{m+2}•A$, encrypted message segment $M_m•B$ and encrypted key $K_{m+2}•B$, or encrypted message segment $M_m•B$ and encrypted key $K_{m+2}•A$.

In step 912, sending machine 106 transmits encrypted message 108 to receiving machine 112, via transmission path 110. Encrypted message 108 may include encrypted message segment $M_m•A$ (or $M_m•B$) and encrypted key $K_{m+2}•B$ (or $K_{m+2}•A$). In an alternative embodiment, sending machine 106 only transmits encrypted message segment $M_m•A$ (or $M_m•B$), but not the encrypted key. Instead, the encrypted key is received at sending machine 106 from receiving machine 112. For example, sending machine 106 may receive the encrypted key as part of an acknowledgement that encrypted message 108 was received.

Next in step 914, a check is performed to see if the last message segment was sent. The check may be performed by checking whether the current index value m is equal to the last index value q. The check may be performed any time after counter m was initiated. If the last message segment was sent, method 900 proceeds to step 916 where sending machine 106 sends an indication that the end of the message was reached. For example, sending machine 106 may send an End-of-Message symbol, via transmission path 110, to receiving machine 112. Next method 900 terminates.

Returning to step 914, if the last message segment was not yet sent, method 900 proceeds to step 918, where the index is incremented. Next method 900 returns to step 906. However, in an embodiment in which encrypted key $K_{m+3} \cdot B$ (or $K_{m+3} \cdot A$) is received from receiving machine 112, then any time prior to returning to step 906 (but after receipt of encrypted key $K_{m+3} \cdot B$–or $K_{m+3} \cdot A$), sending machine 106 uses encryption algorithm 104 and second key B, which is key $K_{m+1}$, (or first key A, which is $K_{m+2}$) to decrypt encrypted key $K_{m+3} \cdot B$ (or encrypted key $K_{m+3} \cdot A$) and obtain new key $K_{m+3}$.

As a result of returning to step 906, steps 906, 908, 910, 912, and 914 are repeated. Since the counter is again incremented during the repetition of step 906, the second time through method 900, m=2, first key A=$K_{m+1}$=$K_3$, second key B=$K_m$=$K_2$, and new key $K_{m+2}$=$K_4$ (if whether first key A is set to equal $K_m$ or $K_{m+1}$ and whether second key B is set equal to $K_{m+1}$ or $K_m$, respectively, depends on whether m has an odd or even and if on the previously count m=1 first key A=$K_m$=$K_1$, second key B=$K_{m+1}$=$K_2$, and new key $K_{m+2}$=$K_3$). In an alternative embodiment, instead of extracting all of message segments $M_1, M_2, \ldots, M_q$ from message M at once in step 902, each time counter m is incremented, the current message segment $M_m$ is extracted from message M. In other embodiments, method 900 may not contain all of the steps above, and/or may contain other steps in addition to or instead of those specified above. For example, in a secure telephone conversation there may be no last message segment check 914. When the caller hangs up, the call ends and method 900 terminates. As another example, method 900 may be performed by multiple modules in which each module performs only a part of method 900. In such an embodiment, each module performs a method that only includes some of method 900.

Figure 10:
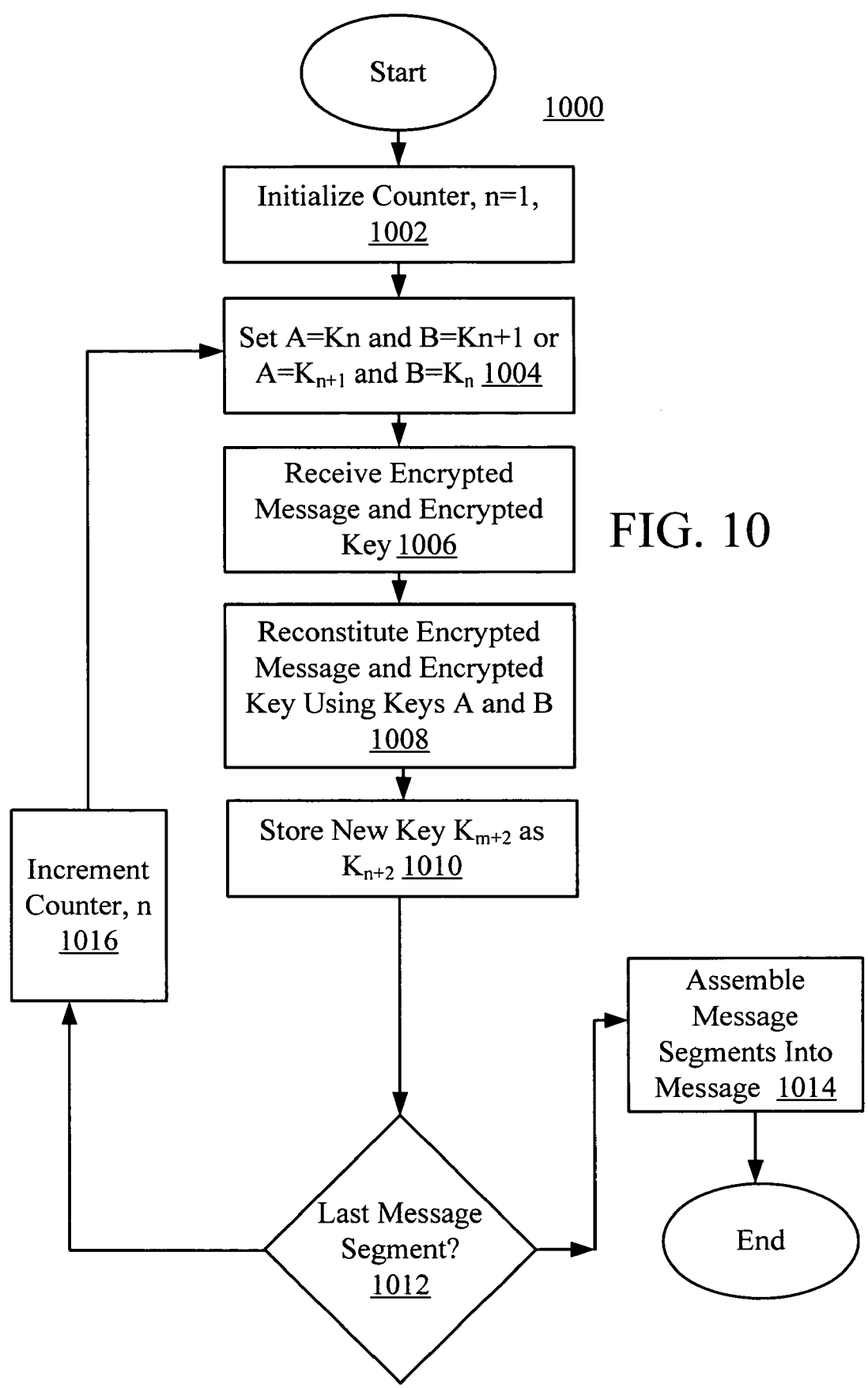
FIG. 10 shows a flowchart of an embodiment of a method for receiving and reconstituting the message sent by the method of FIG. 9.

FIG. 10 shows a flowchart of an embodiment of method 1000 for receiving and decrypting, at receiving machine 112, the encrypted message sent as a result of sending machine 106 implementing method 900. In step 1002, receiving machine 112 initializes a counter n equal to 1 or to a first value of a sequence of index values.

In step 1004, receiving machine 112 sets first key A equal to key $K_n$ and second key B equal to key $K_{n+1}$. In an alternative embodiment, first key A is set equal to key $K_{n+1}$, and second key B is set equal to key $K_n$. In yet another embodiment, whether first key A is set equal to key $K_{n+1}$ or key $K_n$ and whether second key B is set equal to key $K_n$ or key $K_{n+1}$ may be dependent upon the current value of index n (e.g., whether n has an even or odd value).

In step 1006, receiving machine 112 waits until encrypted message segment $M_m \cdot A$ (or $M_m \cdot B$) and encrypted key $K_{m+2} \cdot B$ (or $K_{n+2} \cdot A$) are received. In an alternative embodiment, instead of receiving encrypted key $K_{m+2} \cdot B$ (or $K_{n+2} \cdot A$), receiving machine 112 generates key $K_{n+2}$, forms encrypted key $K_{n+2} \cdot B$ (or $K_{n+2} \cdot A$), and sends encrypted key $K_{n+2} \cdot B$ (or $K_{n+2} \cdot A$) to the sending machine 106.

In step 1008, receiving machine 112 computes $(M_m \cdot A) \cdot A$ (or $(M_m \cdot B) \cdot B$) to decrypt encrypted message segment $M_m \cdot A$ (or $M_m \cdot B$), thereby obtaining the next unencrypted message segment $M_m$. Receiving machine 112 also computes $(K_{m+2} \cdot B) \cdot B$ (or $(K_{m+2} \cdot A) \cdot A$) which equals unencrypted key $K_{m+2}$. Receiving machine 112 is capable of decrypting the encrypted message segment and the encrypted key, because both sending machine 106 and receiving machine 112 possess identical copies of keys A and B. In step 1010, receiving machine 112 stores decrypted key $K_{m+2}$ as key $K_{n+2}$. (The decrypted key $K_{m+2}$ will become key $K_{n+1}$ the next time—if there is a next time—the receiver executes step 1004 upon incrementing counter n by 1.)

Next, in step 1012, receiving machine 112 checks whether an indication was received that the current message segment is the last message segment. For example, receiving machine 112 may check whether an End-of-Message symbol was received from the sender. In another example, there may be no last message segment check 1014, such as in a secure telephone conversation. When the caller hangs up, the call ends and method 1000 terminates. In another embodiment, receiving machine 112 may have received information indicating the total number of message segments to expect, and receiving machine 112 may therefore check whether counter n corresponds to the last message segment. If the current message segment is the last message segment, then receiving machine 112 proceeds to step 1014 where all the message segments received are assembled (e.g., concatenated) into message M. Alternatively, instead of assembling all the message segments together at the end of method 1000, after each message segment is received, the most recently received message segment is combined with (e.g., concatenated with) the prior received message segments. Step 1014 may include performing instructions in reconstituted message 116 and/or outputting the reconstituted message 116, such as by displaying reconstituted message 116 on a display, storing reconstituted message in a file, and/or printing out reconstituted message 116 on paper. After step 1014, method 1000 terminates.

Returning to step 1012, if the current message segment is not the last message segment, method 1000 proceeds to step 1016, where receiving machine 112 increments the counter n to the next index value in the sequence of index values. Next method 1000 repeats steps 1004, 1006, 1008, and 1010. Upon repeating step 1004, as a result of incrementing counter n and setting first key A=$K_{n+1}$ and second key B=$K_n$, the value of first key A becomes what was the new key prior to incrementing n, and the value of second key B becomes the prior value of second key B (if whether first key A is set to equal $K_n$ or $K_{n+1}$ and whether second key B is set equal to $K_{n+1}$ or $K_n$, respectively, depends on whether n has an odd or even and if on the previous count n=1 first key A=$K_n$=$K_1$, second key B=$K_{n+1}$=$K_2$, and new key $K_{n+2}$=$K_3$).

As an example of methods 900 and 1000, Alice wants to send Bob a message M, starting with message segment $M_1$. Alice may be a person, a computer, a software program, a phone, another type of electronic device, a mechanical device, or some other kind of machine, such as sending machine 106. Similarly, Bob may be a person, a computer, a software program, a phone, another type of electronic device, a mechanical device, or some other kind of machine, such as receiving machine 112.

Before any transmission of messages, Alice and Bob both know keys $K_1$ and $K_2$, but it is expected that nobody else knows keys $K_1$ and $K_2$. Alice generates new key $K_3$, which can be used for encrypting a part of the second transmission. Then, for the first transmission, Alice encrypts a first segment $M_1$, as encrypted message $M_1 \cdot K_1$, and encrypts new key $K_3$, as encrypted new key $K_3 \cdot K_2$. Alice then sends encrypted message segment and encrypted new key to Bob. Bob then decrypts encrypted message segment $M_1 \cdot K_1$ and encrypted new key $K_3 \cdot K_2$. Bob decrypts encrypted message segment and encrypted new key by at least computing $M_1 \cdot K_1 \cdot K_1$ and $K_3 \cdot K_2 \cdot K_2$, respectively. Now, Bob knows message segment $M_1$ and new key $K_3$ (in addition to knowing keys $K_1$ and $K_2$).

In order to transmit message segment $M_2$, the second transmission, Alice uses key $K_2$ to encrypt message $M_2$, which is computed as $M_2 \cdot K_2$. Next Alice generates new key $K_4$ for use in the third transmission, and then Alice uses key $K_3$ to encrypt new key $K_4$, which is computed as $K_4 \cdot K_3$. Encrypted message segment $M_2 \cdot K_2$ and encrypted new key $K_4 \cdot K_3$ are transmitted from Alice to Bob. Bob receives these two encrypted transmissions, and decrypts the two transmissions by computing $M_2 \cdot K_2 \cdot K_2$ and $K_4 \cdot K_3 \cdot K_3$. Now, as a result of the decryption, Bob knows message segment $M_2$ and new key $K_4$ (in addition to already knowing keys $K_2$ and $K_3$).

In order to transmit message segment $M_3$, Alice uses key $K_3$ to encrypt message $M_3$, computed as $M_3 \cdot K_3$. Next Alice generates new key $K_5$ for use in the fourth transmission, and Alice uses key $K_4$ to encrypt new key $K_5$, which is computed as $K_5 \cdot K_4$. Encrypted message segment $M_3 \cdot K_3$ and encrypted new key $K_5 \cdot K_4$ are transmitted from Alice to Bob. Bob receives these two encrypted transmissions, and decrypts the two transmissions by computing $M_3 \cdot K_3 \cdot K_3$ and $K_5 \cdot K_4 \cdot K_4$. Now, as a result of the decryption, Bob knows message segment $M_3$ and new key $K_5$ (in addition to knowing keys $K_3$ and $K_4$). This process is repeated until Alice transmits the last message segment.

In other embodiments, method 1000 may not contain all of the steps above, and/or may contain other steps in addition to or instead of those specified above. For example, method 1000 may be performed by multiple modules in which each module performs only a part of method 1000. In such an embodiment, each module performs a method that only includes some of method 1000.

In an embodiment of methods 900 and 1000, the message segments are all of the same size, except for possibly the last message segment. In another embodiment, the message segments may be of different sizes as long as each message segment is shorter than the key used to encrypt the message segment. If the message segment is shorter than its encryption key, the message segment can be padded with other data as long as receiving machine 112 has a way of distinguishing the padding from the actual message segment received. Similarly, in one embodiment, the encryption keys are the same size. In another embodiment, the encryption keys used later in method 900 or 1200 may be shorter than the encryption keys that are used earlier in method 900 or 1000.

In methods 900 and 1000 only two keys are used. Alternatively, there may be any number of keys. Methods 900 and 1000 may be used for any number of keys, except more keys are used, encrypted, and transmitted. In methods 900 and 1000, in any place where A is used B may be used instead and any place where B is used A may be used to obtain other embodiments. In still other embodiments, at each step, either A or B, or both A and B may be formed with composite keys. Composite keys are discussed in conjunction with FIGS. 18B(1), 18(2), 18C, 18D, 18E and 18F.

Figure 11:
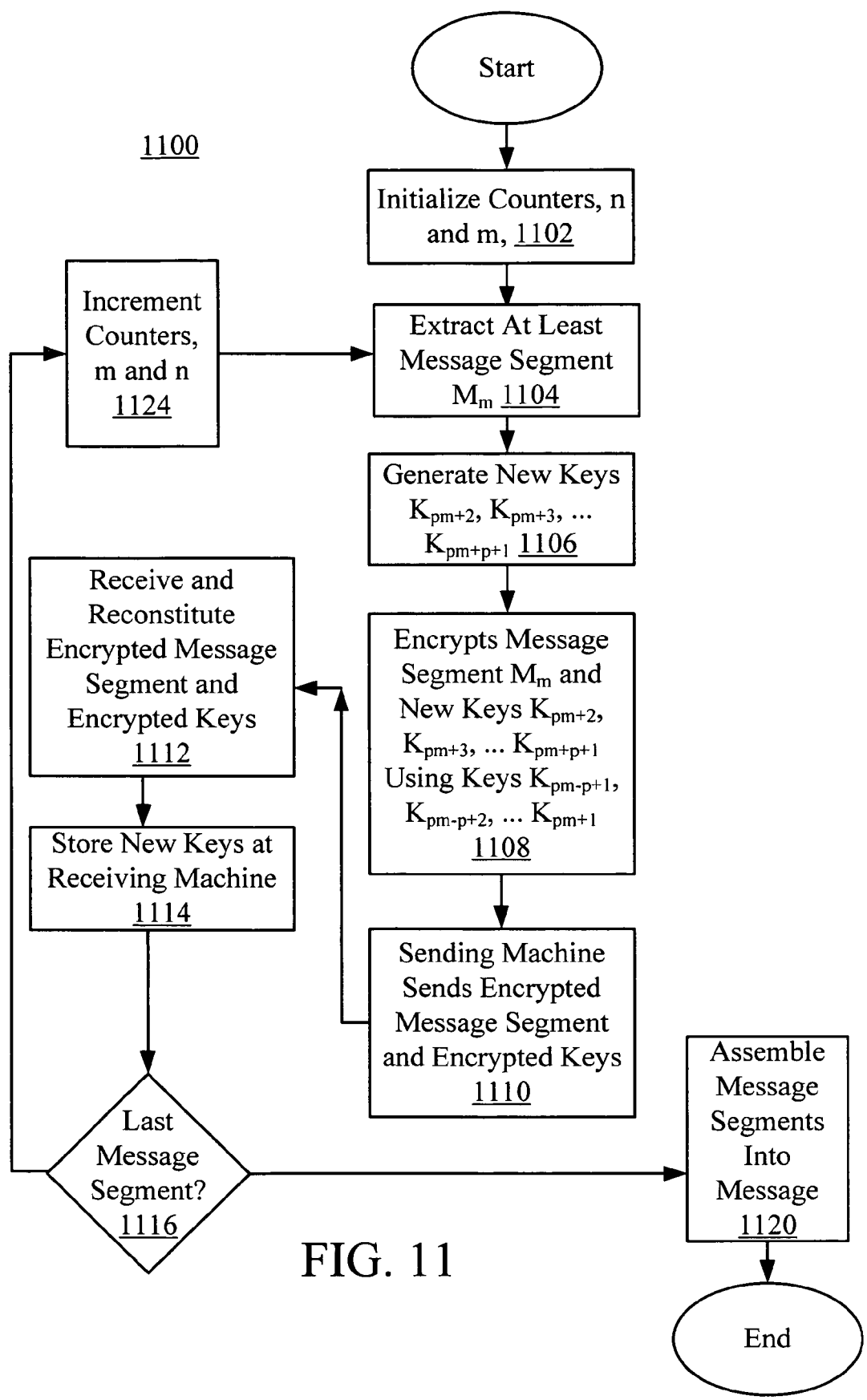
FIG. 11 shows a flowchart of an embodiment of a method of transmitting messages while using any number of keys.

FIG. 11 is a flowchart of an embodiment of method 1100 of transmitting messages while using any number of keys. The combination of methods 900 and 1000 are a specific example of method 1100. Before any transmission of messages, the sending machine 106 and receiving machine 112 are both in possession of keys $K_1, K_2, \ldots K_{p+1}$, and it is expected that no one else knows these keys. It may be convenient to refer to keys $K_1, K_2, \ldots K_{p+1}$ as the first group of keys and to keys $K_2, \ldots K_{p+1}$ as the first set of keys (the combination of key $K_1$ and the first set of keys makes up the first group of keys). A method that may be used for transmitting the first group of keys from sending machine 106 to receiving machine 112 and/or from receiving machine 112 to sending machine 106 is discussed in conjunction with FIG. 19.

In step 1102, at sending machine 106, counter m is initialized to a first of a sequence of index values, and at receiving machine 112 counter n is initialized to a first of a sequence of index values. In step 1104, a message segment $M_m$ from message M is determined. Step 1104 may involve separating from message M each message segment $M_m$ with each increment of counter m. In an alternative embodiment, all of the message segments are extracted prior to performing the rest of method 1100. In step 1106, new keys $K_{pm+2}, K_{pm+3}, \ldots K_{pm+p+1}$ are generated by sending machine 106. It may be convenient to refer to new keys $K_{pm+2}, K_{pm+3}, \ldots K_{pm+p+1}$ as secret keys. It may also be convenient to refer to keys $K_{pm+2}, K_{pm+3}, \ldots K_{pm+p+1}$ as the $m+1^{th}$ set of keys (e.g., the second set of keys when m=1). Thus, setting m=0, yields the first set of keys $K_2, \ldots K_{p+1}$. For example, if p=2, new keys $K_{2m+2}$ and $K_{2m+3}$ are generated each time counter m is incremented. The formulas for the indices give chronological order in which the keys were created. For example, if p=4 and m=5, the index formula pm+2=22, which means that key $K_{pm+2}$, is the 22nd key to be created. Prior to, or as part of, step 1102, unencrypted message 102 may have been generated at message machine 106 or entered into message machine 106 via a keyboard, electronic writing pad, mouse, LAN, WAN, telephone receiver, microphone, and/or USB device or other storage medium.

In step 1108, sending machine 106 encrypts message segment $M_m$ and new keys $K_{pm+}2, K_{pm+3}, \ldots K_{pm+p+1}$ using keys $K_{pm-p+1}, K_{pm-p+2}, \ldots K_{pm+1}$. It may be convenient to refer to keys $K_{pm-p+1}, K_{pm-p+2}, \ldots K_{pm+1}$ as the mth group of keys (e.g., the second group of keys when m=2). In contrast, the $m^{th}$ set of keys is keys $K_{pm-p+2}, K_{pm-p+3}, \ldots K_{pm+1}$. Stated differently, the $m^{th}$ group of keys is a combination of key $K_{pm-p+1}$ and the $m^{th}$ set of keys. In alternative embodiments, any already known key (that is agreed upon in advance by sending machine 106 and receiving machine 112) may be used instead of key $K_{pm-p+1}$ in combination with the $m^{th}$ set of keys to form the $m^{th}$ group of keys. For example, if p=2, message segment $M_m$ and new keys $K_{2m+2}$ and $K_{2m+3}$ are encrypted using keys $K_{2m-1}, K_{2m}$, and $K_{2m+1}$. The formulas used for encrypting message segment $M_m$ and new keys $K_{pm+2}, K_{pm+3}, \ldots K_{pm+p+1}$ are shown in TABLE 4, FIG. 13, which is discussed below. In alternative embodiments, composite keys may be used to encrypt message segment $M_m$ and new keys $K_{pm+2}, K_{pm+3}, \ldots K_{pm+p+1}$. Composite keys are discussed in conjunction with FIGS. 18B(1), 18B(2), 18C, 18D, 18E and 18F.

In step 1110, sending machine 106 transmits the encrypted message segment and the new encrypted keys (which are the contents of TABLE 4, FIG. 13, or permutations of TABLE 4 discussed below) to the receiving machine 112. In an embodiment, a different permutation of TABLE 4 is sent depending on the value of counter m. There are (p+1)! permutations of TABLE 4, which may be used instead of and/or in conjunction with the set of encryptions in TABLE 4. Specifically, depending on the value of m a different permutation of TABLE 4 may be used. The sequences of permutations that may be used are also discussed in conjunction with TABLE 4.

An example of the encrypted key and encrypted message segment when p=2 is shown in TABLE 5, FIG. 14, which is also discussed below. Specifically, sending machine 106 uses key $K_{2m-1}$ to encrypt message $M_m$, computed as $M_m \cdot K_{2m-1}$, sending machine 106 uses key $K_{2m}$ to encrypt key $K_{2m+2}$, computed as $K_{2m+2} \cdot K_{2m}$, and sending machine 106 uses key $K_{2m+1}$ to encrypt key $K_{2m+3}$, computed as $K_{2m+3} \cdot K_{2m+1}$. In an embodiment, only when m is odd (or even) sending machine 106 uses key $K_{2m-1}$ to encrypt message $M_m$, computed as $M_m \cdot K_{2m-1}$, sending machine 106 uses key $K_{2m}$ to encrypt key $K_{2m+2}$, computed as $K_{2m+2} \cdot K_{2m}$, and sending machine 106 uses key $K_{2m+1}$ to encrypt key $K_{2m+3}$, computed as $K_{2m+3} \cdot K_{2m+1}$, while in contrast, when m is even (or odd) sending machine 106 uses key $K_{2m}$ to encrypt message $M_m$, computed as $M_m \cdot K_{2m}$, sending machine 106 uses key $K_{2m+1}$ to encrypt key $K_{2m+2}$, computed as $K_{2m+2} \cdot K_{2m+1}$, and sending machine 106 uses key $K_{2m-1}$ to encrypt key $K_{2m+3}$, computed as $K_{2m+3} \cdot K_{2m-1}$. In other embodiments, different ones of keys $K_{2m-1}, K_{2m}, K_{2m+1}$ or composite keys may be used to encrypt a particular one of $M_m, K_{2m+2}, K_{2m+3}$. Composite keys are discussed in conjunction with FIGS. 18B(1), 18B(2), 18C, 18D, 18E and 18F.

In step 1112, receiving machine 112 receives and decrypts the contents of TABLE 4 or a permutation of TABLE 4 by performing the operations in TABLE 6, FIG. 15 or a permutation of TABLE 6 that corresponds to the current permutation of TABLE 4. An example of the operations of TABLE 6 when p=2 is shown in TABLE 7, FIG. 16, which is discussed, below. Specifically, in TABLE 7, receiving machine 112 uses key $K_{2m-1}$ to reconstitutes the message $M_m$, receiving machine 112 uses key $K_{2m}$ to reconstitute the new key $K_{2m+2}$, and receiving machine 112 uses key $K_{2m+1}$ to reconstitute new key $K_{2m+3}$. TABLE 7 may be the computations that are performed when m is an even (or odd) number. In contrast, when m is an odd (or even) number, receiving machine 112 uses key $K_{2m}$ to reconstitutes the message $M_m$, receiving machine 112 uses key $K_{2m+1}$ to reconstitute the new key $K_{2m+2}$, and receiving machine 112 uses key $K_{2m-1}$ to reconstitute new key $K_{2m+3}$. As a consequence receiving machine 112 possesses $M_m, K_{2m+2}, K_{2m+3}$. In step 1114, receiving machine 112 stores the new keys.

Next, in step 1116, a check is made to determine whether message segment $M_m$ is the last segment. The details of step 1116 are discussed in FIG. 12. Next in step 1120, receiving machine 112 assembles the message segments into message M. In an alternative embodiment, as in method 1000 instead of waiting to receive all of the reconstituted message segments, each reconstituted message segment is combined with earlier received message segments as the encrypted message segments are reconstituted. Step 1120 may include performing instructions in reconstituted message 116 and/or outputting the reconstituted message 116, such as by displaying reconstituted message 116 on a display, storing reconstituted message 116 in a file, and/or printing out reconstituted message 116 on paper.

Returning to step 1116, if message segment $M_m$ is not the last message segment, counters m and n are incremented by one, in step 1124, and method 1100 is repeated. In other embodiments, method 1100 may not contain all of the steps above, and/or may contain other steps in addition to or instead of those specified above. For example, method 1100 may be performed by multiple modules in which each module performs only a part of method 1100. In such an embodiment, each module performs a method that only includes some of method 1100.

The formulas used for labeling the subscripts of the keys may be included in algorithm 200. However, formulas used for labeling the subscripts of the keys have many variations. For example, the formulas may be altered such that the index of the initial key is 0 (instead of 1), is a negative number, or is any other number. As another example, the index values may decrease instead of increase as more keys are generated. As yet another example, the index values may all be multiples of a number such as 2, 3, or any other number.

Figure 12:
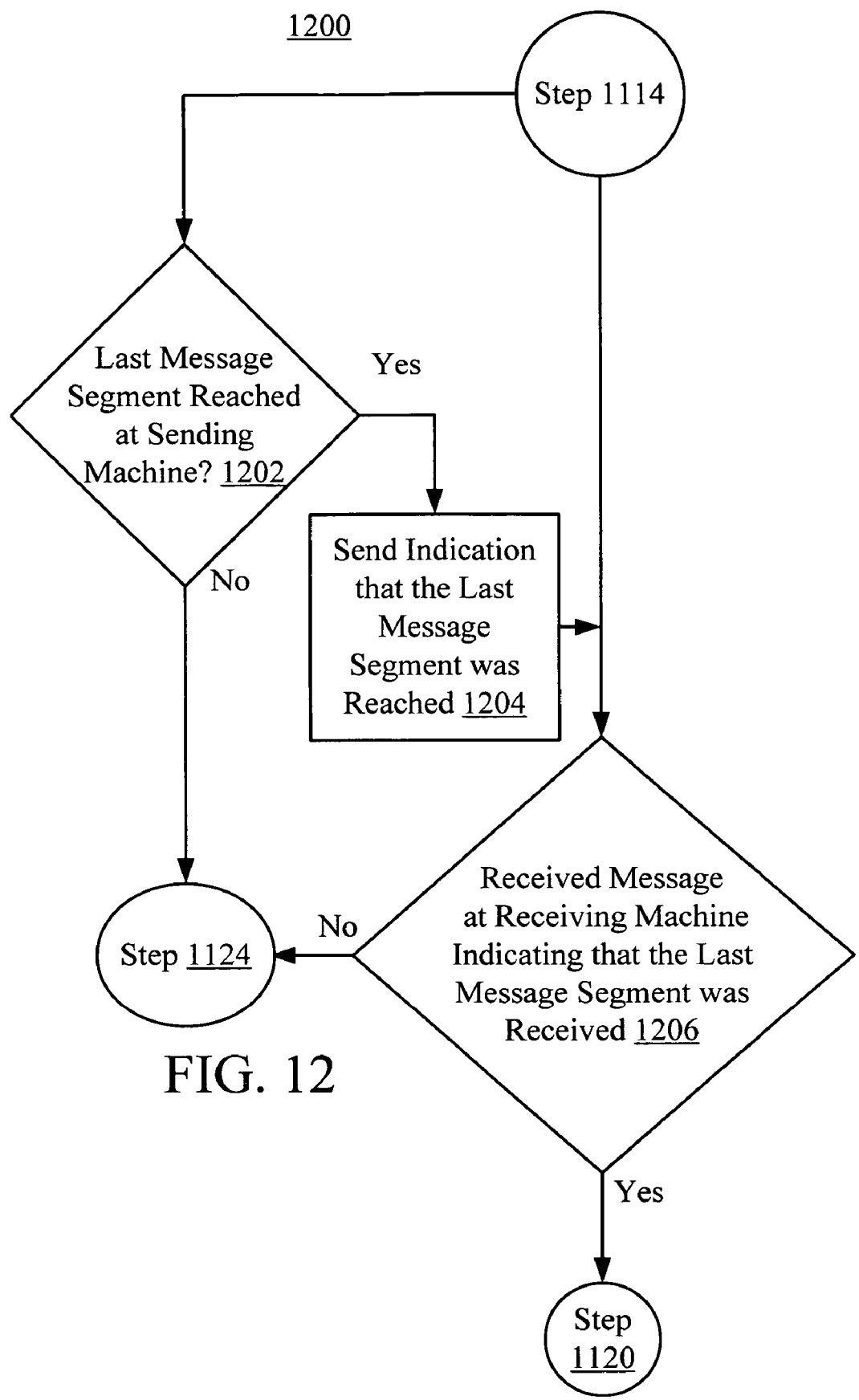
FIG. 12 shows a flowchart of an embodiment of a method for implementing one of the steps of the method of FIG. 11.

FIG. 12 shows a flowchart of an embodiment of a method 1200, which implements step 1116 for checking whether the last message segment has been reached. Sending machine 106 enters step 1202 any time after step 1102. In step 1202, sending machine 106 checks if message segment $M_m$ is the last message segment. For example, step 1202 may check whether index m is the same as the expected last index value. If a determination is made that message segment $M_m$ is the last message segment, then method 1200 proceeds to step 1204 where a message is sent to receiving machine 112 that the end of the message was reached. Step 1204 may be performed any time after step 1102. Next sending machine 106 terminates the portion of method 1100 that is implemented by sending machine 106. Returning to step 1202, if the last message segment has not been reached then sending machine 106 proceeds to step 1124.

Meanwhile, starting any time after incrementing or initializing index n, receiving machine 112 proceeds to step 1206, and checks whether a message was received from sending machine 106 indicating that the end of the message was reached. If the last message segment was reached, then after performing step 1112, receiving machine 112 proceeds to step 1120. If there is no indication that the last message segment was reached, after step 1112 receiving machine 112 proceeds to step 1124 and increments index n.

In another embodiment, multiple message segments may be sent simultaneously, each message segment may be encrypted with a different key. In another embodiment, the number of keys sent with each transmission may vary. In another embodiment, one or more of the new keys that are sent from the sender to the receiver are never used, whether or not the current transmission contains the last message segment. In another embodiment, the encrypted message is sent at a time that is different from the time that the encrypted keys are sent. In another embodiment, one or more of the new keys sent from the sending machine 106 to the receiving machine 112 are used to decrypt past message segments or past encrypted keys instead of future encrypted keys. In another embodiment, the new keys sent by the sender are used to decrypt one or more future message segments that are sent after the next transmission. In other embodiments, method 1200 may not contain all of the steps above, and/or may contain other steps in addition to or instead of those specified above. For example, method 1200 may be performed by multiple modules in which each module performs only a part of method 1200. In such an embodiment, each module performs a method that only includes some of method 1200.

Although in methods 800, 900, and 1100, messages are only sent from sending machine 106 to receiving machine 112, in some cases it may be desirable for sending machine 106 and receiving machine 112 to send each other information back and forth. For example, it may be desirable to use sending machine 106 and receiving machine 112 for sending e-mail messages to one another, for having an instant messenger conversation, for having a telephone conversation, or for sending and receiving messages associated with an Internet application. The transmission of information from receiving machine 112 to sending machine 106 is performed according to methods 800, 900, 1000, and 1100 except sending machine 106 and receiving machine 112 reverse roles. Specifically, receiving machine 112 may be the sender of methods 800, 900, and 1100, and sending machine 106 may be the receiver of methods 900, 1000, and 1100. Consequently, in this embodiment, encryption algorithm 104 is capable of reconstituting messages and reconstitution algorithm 116 is capable of encrypting messages.

FIG. 13 shows a TABLE 4 of the transmission a sender sends to a receiver. TABLE 4 includes new data column 1302, encryption operators column 1304, and encryption keys column 1306. In other embodiments, not all of the information in TABLE 4 is transmitted or other information is transmitted instead of and/or in addition to the information in TABLE 4.

New data column 1302 includes the information that the sender would like to send to receiving machine 106, which receiving machine 106 is assumed not to have possession of yet. The new data sent includes the current message segment $M_m$ and current new keys $K_{pm+2}$, $K_{pm+3}$, ... $K_{pm+p+1}$. New keys $K_{pm+2}$, $K_{pm+3}$, ... $K_{pm+p+1}$ may be the new keys generated in step 908 or 1106. Encryption operator column 1304 includes the operators that are used to encrypt the data in new data column 1302. Any combination of operators may be used, as indicated by the use of the generic operator symbol "•" in each row of new data column 1302.

Encryption key column 1306 includes the keys being used to encrypt the data in new data column 1302, which include keys $K_{pm-p+1}$, $K_{pm-p+2}$, ... $K_{pm+1}$. A given operator of operator column 1304 and a given key of encryption key column 1306 that share the same row form a transformation used to encrypt the data in new data column 1302 in that row. Each row of TABLE 4 is either an encrypted key or an encrypted message segment, which include encrypted message segment $M_m \cdot K_{pm-p+1}$ and encrypted new keys $K_{pm+2} \cdot K_{pm-p+2}$ ... $K_{pm+n+1} \cdot K_{pm+1}$, which are also an example of the encryption operations that may be performed as part of step 910 or 1108, the encrypted message segment and encrypted keys transmitted as part of step 912 or 1110, and the encrypted message segment and encrypted keys. received as part of step 1006 or 1112.

There are certain sequences of the (p+1)! permutations that are more vulnerable (and others that are less vulnerable) to decryption by an unintended receiver of encrypted message 108. In an embodiment, each of the p keys of a set of keys created at a particular value of m is used to form the group of keys for the next either encrypt another key or the next message segment. Thus, each new key is part of a chain of keys that may terminate either when a key from the chain is used to encrypt a message segment or when the last message segment has been transmitted. Each chain starts at m=1. If a chain does nay have any keys that are ever used for encrypting a message segment, then that chain of keys could be replaced by fake data. The keys of a chain that never encrypt any messages do not contribute to the securing of the message except to the extent that the unintended receiver is confused by keys that have not been used and to the extent that the unintended user wastes time trying to decrypt keys that have no use. In an embodiment, sequences of permutations of TABLE 4 that result in chains of keys that are never used are not allowed. In another embodiment, only one chain or only two chains that are never used for encrypting a message segment is allowed. In another embodiment, only 1% of, only 5% of, or only 10% of the p chains that do not encrypt any message segments are allowed. In another embodiment, method 1900 is used to update the keys and each chain of the previous keys is terminated. Method 1900 is discussed in conjunction with FIG. 19.

If only a small number of chains are used to encrypt the majority of the message segments, another vulnerability is created, because only a small number of the encryptions need to be decrypted in order to decrypt the majority of the message. Having the majority of the message may make it easier to decrypt and/or figure out the remainder of the message. In an embodiment, if there are more message segments than keys in a group, sequences of permutations of TABLE 4 are not allowed that result in the majority of a message being encrypted by 10% fewer chains than there are message segments. In an embodiment, if there are fewer message segments than keys in a group, sequences of permutations of TABLE 4 are not allowed that result in the majority of a message being encrypted by 10% fewer chains than there are keys in a group. In another embodiment, if there are more message segments than keys in a group, sequences of permutations of TABLE 4 are chosen that result in an equal use of all chains. In an embodiment, each permutation in a sequence of permutations are chosen randomly, if it is expected that the permutation is likely to result in a sequence that has one or more the above mentioned vulnerabilities, the permutation is discarded. In another embodiment, a pattern of permutations is chosen that does not have any of the above vulnerabilities. In an embodiment in which there are more than p+1 message segments in a message and in which the sequence of permutations is chosen according to a pattern, the pattern has at least p+1 permutations (however, there could be as many as (p+1)! permutations. In an embodiment, there may be fewer than p+1 permutations in a sequence of permutations.

FIG. 14 shows a TABLE 5, which is an example of the transmission that a sender may send to a receiver. TABLE 5 includes new data column 1402, encryption operators column 1404, and encryption keys column 1406.

TABLE 5 is an example of TABLE 4 in which p=2. New data column 1402 includes the information that the sending machine 106 would like to send to the receiving machine 112, which the receiver is assumed not to have possession of yet. The new data sent includes the current message segment $M_m$ and current new keys $K_{2m+2}$, and $K_{2m+3}$. New keys $K_{2m+2}$ and $K_{2m+3}$ may be the new keys generated in step 908 or 1106. Encryption operator column 1404 may be the same as encryption operators 1304, which were described above. Encryption key column 1406 includes the keys being used to encrypt the data in new data column 1402, which include keys $K_{2m-1}$, $K_{2m}$, and $K_{2m+1}$. Each row of TABLE 5 is either an encrypted key or an encrypted message segment, which include encrypted message segment $M_m \cdot K_{2m}$ and encrypted new keys $K_{2m+2} \cdot K_{2m}$ ... $K_{2m+3} \cdot K_{2m+1}$, which may also be the encryption operations performed as part of step 910 or 1108, the encrypted message segment and encrypted keys transmitted as part of step 912 or 1110, and the encrypted message segment and encrypted keys received as part of step 1006 or 1112.

FIG. 15 shows a TABLE 6 of the decryption computation performed by the receiver. TABLE 6 includes new data column 1302, encryption operator column 1304, encryption keys column 1306, and decryption transformation column 1508. In other embodiments, not all of the decryption computations in TABLE 6 are performed and/or other decryption computations may be performed instead of and/or in addition to those indicated in TABLE 6.

New data column 1302, encryption operator column 1304, and encryption keys column 1306 are the same as the corresponding columns in FIG. 13 that have the same column numbers, which were discussed in conjunction with FIG. 13, TABLE 4. Decryption transformation column 1508 shows the transformation applied by the receiver to reconstitute the encrypted data received from the sender. In the embodiment of FIG. 15, the decryption transformations are the same as the encryption transformations formed by encryption operator column 1304 and encryption keys column 1306. Thus, the computations performed to reconstitute the encrypted data in TABLE 4 are $M_m \cdot K_{pm-p+1} \cdot K_{pm-p+1}$, $K_{pm+2} \cdot K_{pm-p+2} \cdot K_{pm-p+2}$, ... $K_{pm+n+1} \cdot K_{pm+1} \cdot K_{pm+1}$, which may also be the computations performed as part of step 1008 or 1112.

FIG. 16 shows a TABLE 7 of the decryption computation performed by the receiving machine 112. TABLE 7 includes new data column 1402, encryption operator column 1404, encryption keys column 1406, and decryption transformation column 1608.

TABLE 7 is an example of TABLE 6 in which p=2. New data column 1402, encryption operator column 1404, and encryption keys column 1406 are the same as the corresponding columns in FIG. 14 that have the same column numbers, which were discussed in conjunction with FIG. 14, TABLE 5. Decryption transformation column 1608 shows the transformation applied by the receiver to reconstitute the encrypted data received from the sender. In the embodiment of FIG. 16, the decryption transformations are the same as the encryption transformations formed by encryption operator column 1404 and encryption keys column 1406. Thus, in an embodiment, on the even (or the odd) values of m the computations performed to reconstitute the encrypted data are $M_m \cdot K_{2m-1} \cdot K_{2m-1}$, $K_{2m+2} K_{2m} \cdot K_{2m}$, and $K_{2m+3} \cdot K_{2m+1} \cdot K_{2m+1}$, which may also be the computations performed as part of step 1008 or 1112 on the odd (or the even) values of m (respectively) the computations performed to reconstitute the encrypted data are $M_m \cdot K_{2m} \cdot K_{2m}$, $K_{2m+2} \cdot K_{2m+1} \cdot K_{2m+1}$, and $K_{2m+3} K_{2m-1} \cdot K_{2m-1}$.

FIGS. 17 and 18 show TABLEs 8 and 9, respectively, which show an example of the first three transmissions for a situation in which two new keys are generated (which corresponds to p=2 in method 1100 of FIG. 11). The rows of TABLEs 8 and 9 are labeled consecutively, and represent aspects of states of message system 100. Later rows occur either chronologically later or simultaneously with rows that are earlier in TABLEs 8 and 9. Row 1702 indicates that at the start of the transmission keys $K_1$, $K_2$, and $K_3$ are known to both the sender and the receiver.

Row 1704 indicates that the counter m is set to 1. Row 1706 indicates that key $K_4$ and key $K_5$ are generated, and that message segment $M_1$, key $K_4$, and key $K_5$ are encrypted and sent to the receiver.

Sending machine 106 uses key $K_1$ to encrypt message $M_1$, key $K_2$ to encrypt key $K_4$, and key $K_3$ to encrypt key $K_5$. The encryptions of message segment $M_1$, key $K_4$, and key $K_5$ are performed by computing $M_1 \cdot K_1$, $K_4 \cdot K_2$, and $K_5 \cdot K_3$, respectively, as indicated in row 1704.

Row 1708 indicates that the encrypted message segment and encrypted keys of row 1706 are received and decrypted. Since receiving machine 112 possesses keys $K_1$, $K_2$, and $K_3$, receiving machine 112 uses key $K_1$ to decrypt the message segment $M_1$, key $K_2$ to decrypt the new key $K_4$, and key $K_3$ to decrypt the new key $K_5$. The decryption is performed by computing $M_1 \cdot K_1 \cdot K_1$, $K_4 \cdot K_2 \cdot K_2$, and $K_5 \cdot K_3 \cdot K_3$.

Row 1710 indicates that by performing the decryption, receiving machine 112 now obtains message segment $M_1$, new key $K_4$, and new key $K_5$. Rows 1712, 1714, 1716, and 1718 are similar to rows 1704, 1706, 1708, and 1710, respectively. However, now the m=2, and consequently, the current message segment is $M_2$, the new keys are $K_6$ and $K_7$. Additionally, since m is currently an even number, the relationship between the indices of the new keys and the indices keys used to encrypt the new keys and relationship between the index of the current message segment and the index of the key used to encrypt the current message segment is different than in the prior transmission in which m was an odd number. Consequently, since m=2, and since keys $K_4$ and $K_5$ are now in the possession of receiving machine 112, now the encrypted message segment is $M_2 \cdot K_4$, the encrypted keys are $K_6 \cdot K_5$ and $K_7 \cdot K_3$, and the decryption computations are $M_2 \cdot K_4 \cdot K_4$, $K_6 \cdot K_5 \cdot K_5$, and $K_7 \cdot K_3 \cdot K_3$. Consequently, the information obtained by receiving machine 112 is message segment $M_2$ the new keys are $K_6$ and $K_7$.

FIG. 18, TABLE 9, shows the next increment of counter m, in which m=3. Rows 1802, 1804, 1806, and 1808 are essentially a repetition of rows 1704, 1706, 1708, and 1710, respectively. However, since the m=3, the current message segment is $M_3$, the new keys are $K_8$ and $K_9$. Similarly, since m=3 and since keys $K_6$ and $K_7$ are now in the possession of receiving machine 112, now the encrypted message segment is $M_3 \cdot K_5$, the encrypted keys are $K_8 \cdot K_6$ and $K_9 \cdot K_7$, and the decryption computations are $M_3 \cdot K_5 \cdot K_5$, $K_8 \cdot K_6 \cdot K_6$, and $K_9 \cdot K_7 \cdot K_7$. Consequently, the information obtained by receiving machine 112 is message segment $M_3$ the new keys are $K_8$ and $K_9$. This process can be repeated for each message segment.

In another embodiment, each group of keys is used to form a set of one or more composite keys that encrypted the new keys and the message. If there are p+1 keys in each group, each composite key may be composed of any number of keys from 2 to p. If p+1 keys were included in all composite key, all of the composite key would be the same. Different composite keys may be encrypted with different numbers of keys. Thus, new key $K_{pm+2}$ may be encrypted with a composite key made of two keys, new key $K_{pm+3}$ may be encrypted with a composite key made of three keys, while new key $K_{pm+3}$ may be encrypted with only one key.

FIGS. 18B(1)-F show examples of a series of transmissions according to different embodiments in which composite keys are used.

In the embodiment of FIGS. 18B(1) and 18B(2), at a given value of counter m, keys $K_m$, $K_{m+1}$, and $K_{m+2}$ are already known. The new key is $K_{m+3}$. Message segment $M_m$ is encrypted and sent as $M_m \cdot K_m$ and new key $K_{m+3}$ is encrypted and sent as $K_{m+3} \cdot (K_{m+1} \cdot K_{m+2})$. In other words, composite key $(K_{m+1} \cdot K_{m+2})$ is used for encrypting new key $K_{m+3}$.

In the embodiment of FIG. 18C, at a given value of counter m, keys $K_m$, $K_{m+1}$, and $K_{m+2}$ are already known. The new key is $K_{m+3}$. Message segment $M_m$ is encrypted and sent as $M_m \cdot K_m \cdot K_{m+2}$ and new key $K_{m+3}$ is encrypted and sent as $K_{m+3} \cdot (K_{m+1} \cdot K_{m+2})$. In other words, composite key $(K_m \cdot K_{m+2})$ is used for encrypting new key $M_m$, composite key $(K_{m+1} \cdot K_{m+2})$ is used for encrypting new key $K_{m+3}$.

In the embodiment of FIGS. 18D and E, FIG. 18E is a continuation of the sequence of transmissions that starts in FIG. 18D. At a given value of counter m, keys $K_m$, $K_{m+1}$, and $K_{m+2}$ are already known. The new key is $K_{m+3}$. Composite key Q is updated according to the equation $Q=Q \cdot K_m$. In other words, when m=1 $Q=K_1$. and when m is equal to any value of m greater than 1, $Q=K_1 \cdot K_2 \ldots K_m$. Message segment $M_m$ is encrypted and sent as $M_m \cdot Q \cdot K_{m+1}$ and new key $K_{m+3}$ is encrypted and sent as $K_{m+3} \cdot (K_m \cdot K_{m+2})$. In other words, composite key $(Q \cdot K_{m+1})$ is used for encrypting new key $M_m$, and composite key $(K_m \cdot K_{m+2})$ is used for encrypting new key $K_{m+3}$.

In the embodiment of FIG. 18F, at a given value of counter m, keys $K_m$, $K_{2m}$, $K_{2m+1}$, $K_{2m+2}$ are already known. The new keys are $K_{2m+3}$ and $K_{2m+4}$. Message segment $M_m$ is encrypted and sent as $M_m \cdot K_m$, new key $K_{2m+3}$ is encrypted and sent as $K_{2m+3} \cdot (K_{2m} \cdot K_{2m+1})$, and new key $K_{2m+4}$ is encrypted and sent as $K_{2m+4} \cdot (K_{2m+1} \cdot K_{2m+2})$. In other words, composite key $(K_{2m} \cdot K_{2m+1})$ is used for encrypting new key $K_{2m+3}$ and composite key $(K_{2m+1} \cdot K_{2m+2})$ is used for encrypting new key $K_{2m+4}$.

In another embodiment, a portion of each message segment is encrypted with a different one of the keys of the current group of keys as long as there are at least as many bits in the message segment as there are keys. If the keys are longer than the portions of the message segment, then each portion is padded with other data (e.g., a string of 0s).

In FIGS. 13-18F although the same symbol is used for operator •, each operator • that is in a different row may be different for the operator • in another row. Two operators • that share the same row of the same table are either the same operator or inverse operators of one another.

Figure 19:
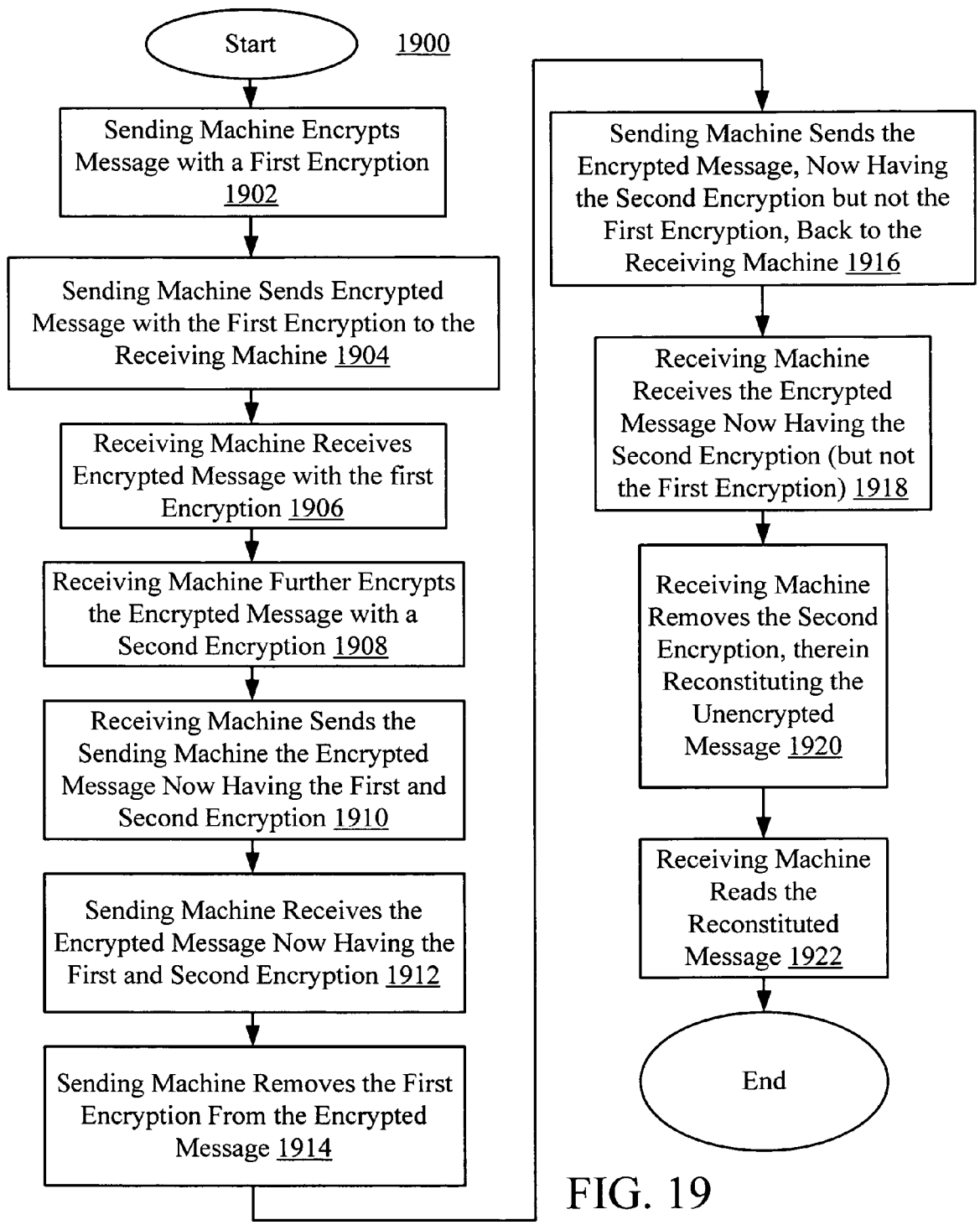
FIG. 19 shows a flowchart of an embodiment of a method for exchanging encrypted messages without necessarily exchanging any keys.

FIG. 19 shows a flowchart of an embodiment of a method 1900 for exchanging messages without necessarily exchanging any keys. In this embodiment, collection of keys 105 includes at least one key, $K_s$, that is known by sending machine 106 but is expected not to be known by receiving machine 112. Similarly, key 118 includes at least one key, $K_r$, which is known by receiving machine 112 but is expected not to be known by sending machine 106. Additionally, encryption algorithm 104 is capable of reconstituting messages, and message reconstitution algorithm 114 is capable of encrypting messages.

In step 1902, sending machine 106 encrypts unencrypted message 102 with a first encryption using the key $K_s$ and encryption algorithm 104, and forms encrypted message 108. Prior to, or as part of, step 1902, unencrypted message 102 may have been generated at message machine 106 or entered into message machine 106 via a keyboard, electronic writing pad, mouse, LAN, WAN, telephone receiver, microphone, USB device, and/or other storage medium. In step 1904, sending machine 106 sends encrypted message 108, via transmission path 110, to receiver receiving machine 112.

In step 1906, receiving machine 112 receives encrypted message 108. Receiving machine 112 is expected to not be presently capable of decrypting encrypted message 108, because encrypted message 108 was encrypted by key $K_s$. Instead, in step 1908 receiving machine 112 further encrypts encrypted message 108 with a second encryption using message reconstitution algorithm 114 and key $K_r$.

In step 1910, receiving machine 112 sends encrypted message 108 back to sending machine 106 (encrypted message 108 is now at least doubly encrypted by being encrypted with both the first and the second encryption). In step 1912, sending machine 106 receives encrypted message 108. In step 1914, sending machine 106 removes the first encryption, which is associated with key $K_s$, leaving encrypted message 108 encrypted with only one encryption. However, now encrypted message 108 has the second encryption, which was placed on encrypted message 108 by receiving machine 112 using key $K_r$. In an embodiment, since the first and second encryption transformations are elements of a commutative group, once the sender removes the first encryption (while leaving the second encryption), the resulting encrypted message is no different than were the first encryption never used.

In step 1916, sending machine 106 sends encrypted machine 108, via transmission path 110, back to receiving machine 112. In step 1918, receiving machine 112 receives encrypted message 108. In step 1920, receiving machine 112 reconstitutes (e.g., decrypts) encrypted message 108 into reconstituted message 116 (which is expected to be unencrypted message 102) using message reconstitution algorithm 114 and key $K_r$. In step 1922, receiving machine 112 reads reconstituted message 116. Step 1922 may include performing instructions in reconstituted message 116 and/or outputting the reconstituted message 116, such as by displaying reconstituted message 116 on a display, storing reconstituted message 116 in a file, and/or printing out reconstituted message 116 on paper.

To send multiple message segments, method 1900 may be applied multiple times. To conduct a two way communication, the sender and receiver just reverse roles, and messages are sent from receiving machine 112 to sending machine 106. Using method 1900 neither sending machine 106 nor receiving machine 112 needs to be aware of the key or encryption algorithm the other is using or how often the other changes keys or encryption algorithms. In other embodiments, method 1900 may not contain all of the steps above, and/or may contain other steps in addition to or instead of those specified above. For example, method 1900 may be performed by multiple modules in which each module performs only a part of method 1900. In such an embodiment, each module performs a method that only includes some of method 1900. Although in the above example, method 1900 is used in a situation in which key $K_s$ is not known by the receiver and key $K_r$ is not know by the sender, method 1900 may also be used if sender knows key $K_r$ and/or if the receiver knows $K_s$.

As an example of method 1900, suppose the sender wants to transmit the message M=0011 1010 0101. Suppose also that the sender uses or creates keys $A_1$=1110, $A_2$=1011, and $A_3$=0110. Suppose the receiver uses or creates keys $B_1$=0010, $B_2$=0110, and $B_3$=1001. The sender divides M into three segments, which are $M_1$=0011, $M_2$=1010, $M_3$=0101. Suppose the sender's transformation uses the operator •=($\oplus$, $\oplus$,$\leftrightarrow$,z,900 ) and the receiver's transformation uses the operator ▫=($\oplus$,$\leftrightarrow$,$\oplus$,$\leftrightarrow$) and that these transformations stay constant for each segment.

Then the transmission of M from the sender to the receiver works as follows. The sender transmits the encrypted message segment $M_1$•$A_1$=0011•1110=1110 to the receiver. The receiver further encrypts the encrypted message segment with a second encryption, which is transmitted as ($M_1$•$A_1$)▫$B_1$=1110▫0010=1001 back to the sender. The sender removes the first encryption by applying the transformation •$A_1$, resulting in the encrypted message segment (($M_1$•$A_1$)▫$B_1$)•$A_1$=1001•1110=0100, which still has the second encryption and which is sent back to the receiver. The receiver decrypts the first message segment as ((($M_1$•$A_1$)▫$B_1$)•$A_1$)▫$B_1$=0100▫0010=0011, which completes the secure transmission of the first message segment $M_1$ of the message.

For the second message segment $M_2$, the sender encrypts message segment $M_2$ as $M_2$•$A_2$=1010•1011=0010, which is sent to the receiver. The receiver encrypts the message segment with the second encryption as ($M_2$•$A_2$)▫$B_2$=0010▫0110=0001, which is transmitted back to the sender. The sender removes the first encryption, resulting in the encrypted message segment (($M_2$•$A_2$)▫$B_2$)•$A_2$=0001•1011=1001, which is sent back to the receiver. The receiver decrypts the second message segment by removing the second encryption, resulting in ((($M_2$•$A_2$)▫$B_2$)•$A_2$)▫$B_2$=1001▫0110=1010, which completes the secure transmission of the second message segment $M_2$ of the message.

For the third message segment $M_3$, the sender encrypts the third message segment with the first encryption, and transmits $M_3$•$A_3$=0101•0110=0000 to the receiver. The receiver further encrypts the third message segment with a second encryption, resulting in ($M_3$•$A_3$)▫$B_3$=0000▫1001=1100, which is transmitted back to the sender. The sender then removes the first encryption, resulting in (($M_3$•$A_3$)▫$B_3$)•$A_3$=1100•0110=1001, which is sent back to the receiver. The receiver decrypts the third message segment by removing the second encryption, resulting in ((($M_3$•$A_3$)▫$B_3$)•$A_3$)▫$B_3$=1001▫1001=0101, which completes the secure transmission of the third and final message segment $M_3$ of the message M.

In some applications, method 1900 may be used for securely distributing one or more keys so that a sender and receiver may subsequently communicate using cryptographic methods that assume that the sender and receiver already possess an initial set of one or more identical keys. In the cryptographic literature, methods in which the sender and receiver use an initial set of identical keys are sometimes called private key algorithms. As an example of a private key algorithm secure key distribution, suppose K is a 256-bit key for the AES cryptographic algorithm. Using method 1900, the sender creates an unpredictable or randomly generated key A, encrypts key K using the transformation $\oplus A$, and transmits encrypted key A, which is $K \oplus A$, to the receiver. The receiver creates an unpredictable or randomly generated key B, which is used to further encrypt the encrypted key with a second encryption using transformation $\oplus B$, such that encrypted key A is now $(K \oplus A) \oplus B$. The receiver transmits the encrypted key $(K \oplus A) \oplus B$ back to the sender. The sender removes the first encryption by applying $\oplus A$ a second time, which results in encrypted key $((K \oplus A) \oplus B) \oplus A = K \oplus B$. Next the sender sends encrypted key $K \oplus B$ back to the receiver. The receiver computes $(K \oplus B) \oplus B = K$ so that now the receiver and sender both possess the 256-bit AES key K. Subsequently, the sender and receiver may proceed to securely communicate using the AES cryptographic algorithm, using key K. Similarly, a key may be sent via method 1900 from a first party to a second party, and then method 800 may be used for transmitting messages (using the key sent via method 1900) between the two parties. Method 1900 may also be used to securely distribute multiple keys. For example, the initial keys that the sender and receiver are assumed to both have in their possession before using methods 900, 1000, and 1100 and before the methods associated with the embodiments of FIGS. 18B(1)-F may be securely distributed using method 1900.

In methods 800, 900, 1000, 1100, and 1900, other embodiments may be obtained by substituting physical keys and/or electronic keys that open and close physical locks, which are used to lock containers, within which the messages and (in the case of methods 900, 1000, and 1100) the new keys are locked and transferred between a sender and a receiver. Also, in methods 800, 900, 1000, 1100, and 1900 the encrypted messages and encrypted keys (or the locked messages and the locked keys) may never change locations. Instead the sender and receiver may visit a particular location to retrieve and/or place the locked and/or encrypted messages and/or keys.

Figure 20:
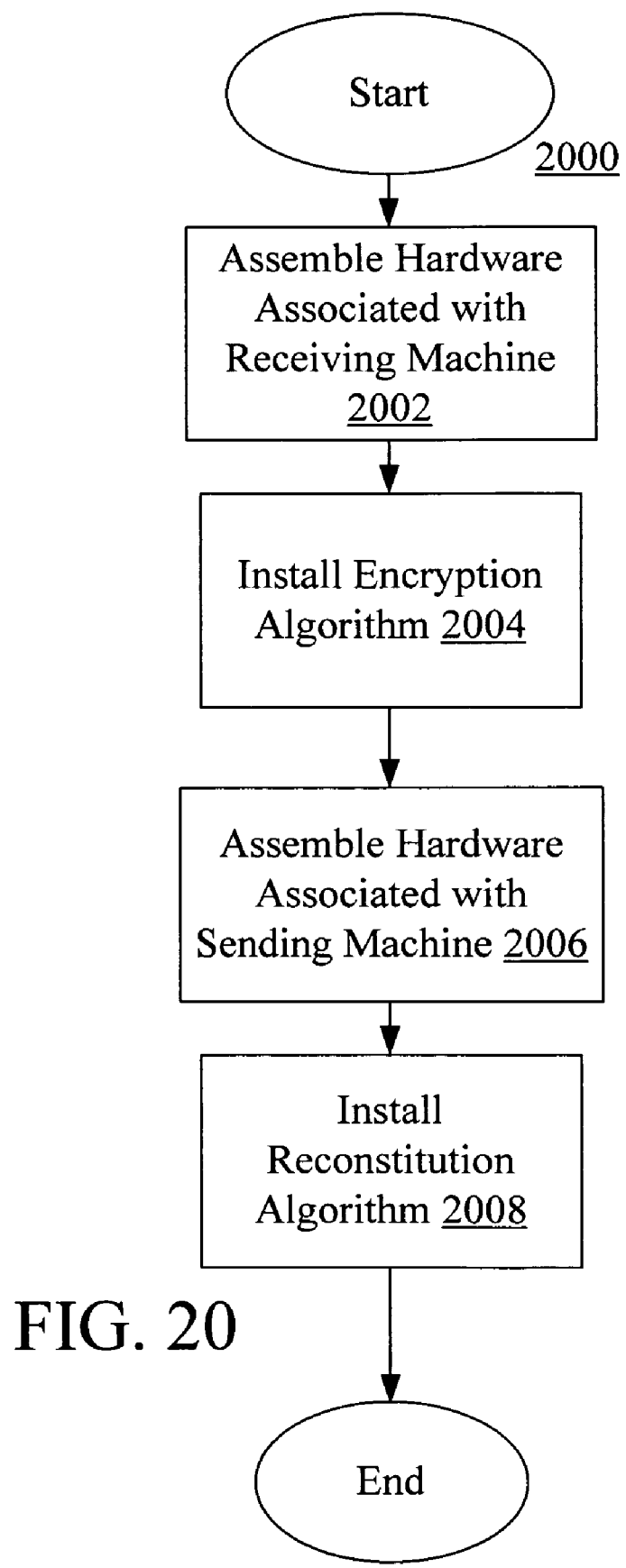
FIG. 20 shows a flowchart of an example of a method of making the messaging system of FIG. 1.

FIG. 20 shows a method 2000 of making message system 100. In step 2002 the hardware for sending machine 106 is constructed. Step 2002 may include assembling a machine, such as machine 600, which in turn may include assembling output system 602, input system 604, memory system 606, processor system 608, communication system 612, input/output system 614, and transformation module 616. Step 2002 may also include connecting together output system 602, input system 604, memory system 606, processor system 608, communication system 612, input/output system 614, and transformation module 616. In step 2004 encryption algorithm 104 is installed, which may include installing algorithm 200 and/or storing algorithm 200 within memory system 606.

In step 2006 the hardware for receiving machine 112 is constructed. Step 2006 may include assembling a machine such as machine 600, as described in step 2002. In step 2008 reconstitution algorithm 114 is installed, which may include installing algorithm 200 and/or storing algorithm 200 within memory system 606. After step 2008, method 2000 terminates. The pair of step 2006 and 2008 may be performed in any order (including simultaneously) with respect to the pair of steps 2002 and 2004. In other embodiments, method 2000 may not contain all of the steps above, and/or may contain other steps in addition to or instead of those specified above.

For example, method 2000 may be performed by multiple modules in which each module performs only a part of method 2000. In such an embodiment, each module performs a method that only includes some of method 2000.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A machine-implemented method implemented on a sender machine having a processor and a memory, the method comprising:

the processor encrypting a first segment of a message, therein forming an encrypted first message segment, wherein the sender machine, which is at a first location, has possession of a first group of keys, the first group of keys includes a first set of keys that were not previously used for encryption in a transmission of the message to a receiver machine, and at least one more key that was previously used for encryption in a prior transmission as part of sending the message to the receiver machine, the sender machine, at the first location, has possession of a second set of keys that have been previously transmitted to the receiver machine as part of sending the message to the receiver machine, the encrypted message segment is encrypted with at least one key from the first group of keys, the first set of keys includes at least one key, and the second set of keys includes at least one key;

the processor encrypting the second set of keys with the first group of keys, therein forming an encrypted second set of keys, each key of the first group of keys being used in the encrypting of the first message segment or the encrypting of the second set of keys;

the processor encrypting a second message segment with at least one key from a second group of keys, therein forming a second encrypted message segment, wherein the second group of keys includes the second set of keys and at least one other key; and the processor encrypting a third set of keys with the second set of keys, therein forming an encrypted third set of keys.

2. The method of claim 1, wherein at least one key from the first set of keys includes at least a string of bits.

3. The method of claim 1, further comprising extracting the first segment of the message from the message prior to encrypting the first segment of the message.

4. The machine implemented method of claim 1, further comprising:

sending the encrypted first message segment and the encrypted second set of keys from the sender machine to the receiver machine.

5. The machine implemented method of claim 1, wherein the first set of keys and the second set of keys are different from one another.

6. The machine-implemented method of claim 1, further comprising: prior to encrypting the second set of keys, generating the second set of keys.

7. The machine implemented method of claim 1, wherein the at least one other key of the second group of keys includes at least one key from the first set of keys.

8. The machine implemented method of claim 1, wherein the first set of keys includes only one key.

9. The machine implemented method of claim 1, wherein the second set of keys includes only one key.

10. The machine implemented method of claim 1, wherein the first set of keys includes at least two keys.

11. The machine implemented method of claim 1, wherein the second set of keys includes at least two keys.

12. The method of claim 1, wherein the encrypted first message segment is encrypted with a composite of keys from the first set.

13. The machine-implemented method of claim 1, further comprising:
wherein the second set of keys is encrypted with a composite of keys from the first set.

14. The method of claim 1, further comprising:
prior to encrypting the first message segment, extracting the first message segment from the message;
prior to encrypting the second set of keys, generating the second set of keys; and
after encrypting the first message segment and after encrypting the second set of keys, sending the encrypted first message segment and the encrypted second set of keys from the sender to the receiver.

15. The method of claim 1, further comprising:
prior to encrypting the first message segment, extracting the first message segment from the message;
prior to encrypting the second set of keys, generating the second set of keys; and
after encrypting the first message segment and after encrypting the second set of keys, sending the encrypted first message segment and the encrypted second set of keys from the sender to the receiver;
generating a third set of keys;
encrypting a second message segment, therein forming a second encrypted message segment, wherein
the second message segment is encrypted with a second group of keys
the second group of keys includes at least the second set of keys and at least one other key, and
the at least one other key of the second group of keys is selected from the first set of keys;
encrypting the third set of keys with the second set of keys, therein forming an encrypted third set of keys; and
sending the encrypted third set of keys with the second encrypted message segment from the sender to the receiver.

16. The method of claim 15, wherein the receiver has possession of the first group of keys, and the method further comprises:
at the receiver, receiving the encrypted first message segment and the encrypted second set of keys from the sender;
reconstituting the second set of keys based on at least the first group of keys, therein causing the receiver to have possession of the second group of keys;
at the receiver, receiving the encrypted second message segment and the encrypted third set of keys from the sender;
reconstituting the third set of keys based on at least the second group of keys, therein causing the receiver to have possession of a third group of keys;
reconstituting the first message segment based on at least the encrypted first message segment and the first group of keys;
reconstituting the second message segment based on at least the encrypted second message segment and the second group of keys; and
reconstituting the message based on at least the first message segment and the second message segment.

17. The method of claim 1, wherein the receiver has possession of the first group of keys, and the method further comprises:
at the receiver, receiving the encrypted first message segment and the encrypted second set of keys from the sender.

18. The method of claim 1, wherein the receiver has possession of the first group of keys, and the method further comprises:
at the receiver, reconstituting the second set of keys based on at least the first group of keys, therein causing the receiver to have possession of a second group of keys.

19. The method of claim 1, wherein the receiver has possession of the first group of keys,
and the method further comprises:
reconstituting the first message segment based on at least the encrypted first message segment and the first group of keys.

20. A computer-readable medium storing thereon one or more instructions, which when implemented cause a processor to carry out the method of claim 1.

21. A computer-readable medium storing thereon one or more instructions, which when implemented cause a processor to carry out the method of claim 2.

22. A computer-readable medium storing thereon one or more instructions, which when implemented cause a processor to carry out the method of claim 3.

23. A computer-readable medium storing thereon one or more instructions, which when implemented cause a processor to carry out the method of claim 4.

24. A computer-readable medium storing thereon one or more instructions, which when implemented cause a processor to carry out the method of claim 5.

25. A computer-readable medium storing thereon one or more instructions, which when implemented cause a processor to carry out the method of claim 6.

26. A computer-readable medium storing thereon one or more instructions, which when implemented cause a processor to carry out the method of claim 7.

27. the method of claim 1, wherein at least one key from the first set of keys includes at least a string of bits, the encrypting including
applying a string of binary operators, each operator of the string of binary operators being applied to a different pair of bits,
a first bit of the pair of bits being one of the bits of the string of bits that make up the key, and
a second bit of the pair of bits being one of a series of bits that represent the first message segment.

28. The machine implemented method of claim 1, further comprising:
sending the encrypted first message segment and the encrypted second set of keys from the sender to a receiver on a transmission path,
repeating
the encrypting, which was performed on the first segment of the message, for another segment of the message, therein forming another encrypted message segment, and the encrypting which was performed on the second set of keys with the first group of keys, for a new set of key with a next set of keys therein forming an encrypted new set of keys;

wherein all encrypted message segments are sent on the same transmission path.

29. The method of claim 1, wherein the second set of keys is encrypted with at least one composite key constructed from at least two keys of the first set of keys.

30. The method of claim 1, wherein the second set of keys is encrypted with at least one composite key constructed from at least two keys of the first set of keys by at least encrypting a first of the two keys with a second of the two keys.

31. The method of claim 1, wherein the second set of keys has only one key, which is encrypted with a composite key constructed from all keys of the first set of keys, the first set of keys including at least two keys.

32. The method of claim 1, wherein the processor encrypting the second set of keys with the first group of keys includes at least encrypting the second set of keys with at least one composite key constructed from at least two keys selected from the first group of keys.

33. The machine-method of claim 1, the first segment of the message having no more bits than any of the keys in the first group of key and no more bits than any of the keys of the second set of keys.

34. A machine-implemented method that is implemented by a machine that includes a processor, the method comprising:

the processor selecting a segment of a message as the current message segment;
wherein a first location has possession of the current group of keys that includes a current set of keys that were not previously used for encryption in a transmission of the message to a receiver and one more key from a prior group of keys that was previously used for encryption in a transmission as part of sending the message to a second machine that is associated with the receiver;
the processor retrieving a next set of keys that is different from the current set of keys, the next set of keys includes at least one key, and the next set of keys is assumed to be known to an intended receiver of the current message segment;
the processor encrypting the current segment of a message, therein forming a current encrypted message segment, wherein
the current encrypted message segment is encrypted with at least one key from the current group of keys; and
the processor encrypting the next set of keys with the current set of keys, therein forming an encrypted next set of keys; each of the current group of keys being used for encrypting either the current message segment or the next set of keys;
the processor sending the current encrypted message segment and the encrypted next set of keys, via a transmission path to the receiver;
the processor replacing the current group of keys by at least
designating as the current group of keys a combination of at least one key chosen from the current set of keys, and the next set of keys, and
replacing the current set of keys with the next set of keys by designating the next set of keys as the current set of keys;
the processor choosing another message segment as the current message segment and repeating
the retrieving of a next set of keys that is different from the current set of keys,
the encrypting of the current segment,
the encrypting of the next set of keys,
the sending of the current encrypted message segment, and
the replacing of the current group of keys.

35. The method of claim 34, wherein during each performance of the repeating the current encrypted message segment and the next set of keys are sent on the same transmission path.

36. The method of claim 34, wherein during each performance of the repeating, generating the next set of keys.

37. The method of claim 34, wherein the receiver is allowed to process information sent to the receiver independently of the time.

38. The method of claim 34, wherein the keys of the next set of keys are sent only once to the receiver.

* * * * *